(12) United States Patent
Saroiu et al.

(10) Patent No.: US 12,219,358 B2
(45) Date of Patent: Feb. 4, 2025

(54) RESISTANCE TO SIDE-CHANNEL ATTACKS ON 5G NETWORK SLICES

(71) Applicant: Microsoft Technology Licensing, LLC, Redmond, WA (US)

(72) Inventors: Stefan Saroiu, Redmond, WA (US); Paramvir Bahl, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 301 days.

(21) Appl. No.: 17/448,041

(22) Filed: Sep. 17, 2021

(65) Prior Publication Data

US 2023/0092245 A1    Mar. 23, 2023

(51) Int. Cl.
| | |
|---|---|
| H04W 12/122 | (2021.01) |
| G06F 21/53 | (2013.01) |
| H04L 41/0806 | (2022.01) |
| H04L 47/22 | (2022.01) |
| H04W 12/03 | (2021.01) |
| H04W 84/04 | (2009.01) |

(52) U.S. Cl.
CPC .......... *H04W 12/122* (2021.01); *G06F 21/53* (2013.01); *H04L 41/0806* (2013.01); *H04L 47/22* (2013.01); *H04W 12/03* (2021.01); *G06F 2221/033* (2013.01); *H04W 84/042* (2013.01)

(58) Field of Classification Search
CPC . H04W 12/122; H04W 12/03; H04W 84/042; G06F 21/53; G06F 2221/033; H04L 41/0806; H04L 9/005
See application file for complete search history.

(56) References Cited

U.S. PATENT DOCUMENTS

| | | | | |
|---|---|---|---|---|
| 9,065,751 | B2* | 6/2015 | Almhana | H04L 47/822 |
| 9,867,213 | B2* | 1/2018 | Agardh | H04W 72/56 |
| 10,063,590 | B1* | 8/2018 | Sharifi Mehr | H04L 63/205 |
| 10,299,282 | B2* | 5/2019 | Del Carpio Vega | H04W 74/0808 |
| 10,367,746 | B2* | 7/2019 | Xu | H04L 47/2441 |
| 10,959,218 | B2* | 3/2021 | Babaei | H04W 72/20 |
| 11,388,078 | B1* | 7/2022 | Sommers | H04L 43/50 |

(Continued)

OTHER PUBLICATIONS

Li et al. ("Side Channel Attack-Aware Resource Allocation for URLLC and eMBB Slices in 5G RAN", IEEE Access, IEEE, USA, vol. 8, Dec. 25, 2019 (Dec. 25, 2019), pp. 2090-2099 (Note: Li et al. was cited in the IDS filed on Jan. 11, 2023) (Year: 2019).*

(Continued)

*Primary Examiner* — Venkat Perungavoor
*Assistant Examiner* — Peiliang Pan
(74) *Attorney, Agent, or Firm* — Mark K. Young; Mark Young PC

(57) ABSTRACT

Resistance to vulnerabilities from timing-based side-channel attacks on 5G network slices that share underlying physical infrastructure and resources may be enhanced by selectively imposing time-based constraints on service provisioning and data handling to obscure data-driven time variations that occur during workload execution in a slice that can leak secret information. By preventing timing leakage from the 5G network slices, an attacker cannot observe execution latencies to thereby infer the constituency of workload characteristics. In addition, the attacker cannot create contention for shared resources on its own slice to observe an extent to which the shared resources are utilized by a targeted slice.

9 Claims, 24 Drawing Sheets

(56) References Cited

U.S. PATENT DOCUMENTS

| | | | | |
|---|---|---|---|---|
| 11,558,769 | B2* | 1/2023 | Sawabe | H04W 28/10 |
| 11,586,755 | B1* | 2/2023 | Volvovski | H04L 67/1097 |
| 11,689,367 | B2* | 6/2023 | Ying | H04L 9/30 |
| | | | | 455/411 |
| 11,716,627 | B2* | 8/2023 | Saroiu | H04W 72/12 |
| | | | | 455/411 |
| 11,728,964 | B2* | 8/2023 | Resch | G06F 21/31 |
| | | | | 709/212 |
| 11,784,711 | B2* | 10/2023 | Akyildiz | H04W 24/02 |
| | | | | 455/12.1 |
| 11,910,398 | B2* | 2/2024 | He | H04L 1/1896 |
| 2019/0304477 | A1* | 10/2019 | Wojcieszak | G10L 19/24 |
| 2020/0044943 | A1* | 2/2020 | Bor-Yaliniz | H04L 41/5009 |
| 2023/0007099 | A1* | 1/2023 | Stockert | G06Q 50/18 |
| 2023/0177199 | A1* | 6/2023 | Volvovski | G06F 21/6254 |
| | | | | 726/6 |
| 2024/0032052 | A1* | 1/2024 | Babaei | H04W 72/23 |

OTHER PUBLICATIONS

Li, et al., "Side Channel Attack-Aware Resource Allocation for URLLC and eMBB Slices in 5G RAN", In Proceedings of IEEE Access, vol. 8, Dec. 25, 2019, pp. 2090-2099.

"International Search Report and Written Opinion Issued in PCT Application No. PCT/US22/037955", Mailed Date: Oct. 6, 2022, 11 Pages.

Yi, et al., "Improving Security of 5G Networks with Multiplicative Masking Method for LDPC Codes", In Journal of Computers & Electrical Engineering, vol. 95, Issue 2, Aug. 24, 2021, 7 Pages.

* cited by examiner

900

500

2300

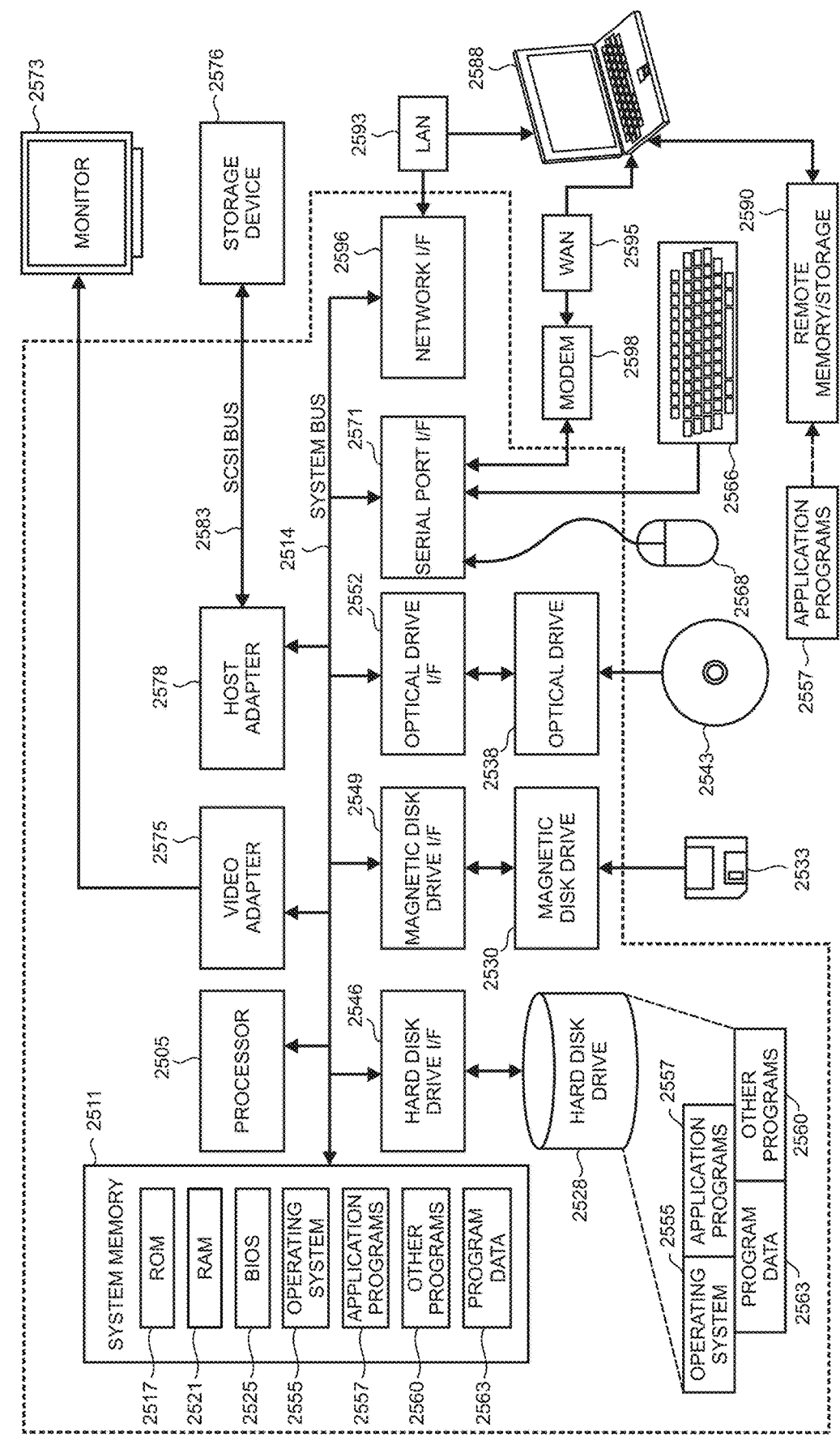

RESISTANCE TO SIDE-CHANNEL ATTACKS ON 5G NETWORK SLICES

BACKGROUND

Fifth generation (5G) mobile networks offer the ability to connect tens of billions of intelligent devices, densely deployed and generating orders of magnitude more data to be handled by the network. In addition to providing substantial performance enhancements, future 5G mobile networks will also change the mobile network ecosystem. Building on the network slicing concept, 5G allows service providers to "slice" shared network infrastructure into separate logical networks that may be operated independently and targeted at specific services in a cost-effective manner. However, 5G network slices may be vulnerable to side-channel exploitations that may enable an attacker to gain access to workload secrets such as encryption keys, passwords, and other sensitive or privileged data across slice boundaries. In shared resource environments that support 5G network slicing configurations, such side-channel attack vulnerabilities could allow one slice to improperly access information from another slice.

SUMMARY

Resistance to vulnerabilities from timing-based side-channel attacks on 5G network slices that share underlying physical infrastructure and resources may be enhanced by selectively imposing time-based constraints on service provisioning and data handling to obscure data-driven time variations that occur during workload execution in a slice that can leak secret information. By preventing timing leakage from the 5G network slices, an attacker cannot observe execution latencies to thereby infer the constituency of workload characteristics. In addition, the attacker cannot create contention for shared resources on its own slice to observe an extent to which the shared resources are utilized by a targeted slice.

In various illustrative examples, the time-based constraints include perturbing the inherent timing of 5G user plane data to follow a synthetic distribution. Such secret-independent traffic shaping may comprise imposing fixed data packet length and fixed delivery intervals irrespective of workload. Some limited deviation in packet length and interval may be allowable for some traffic types without revealing secret information. Virtualized network functions that enable 5G network slices to be created and services provisioned may be hardened to operate in constant time independently from their input. Temporal isolation may also be provided for the 5G network slices by enforcing a time-restricted schedule with which infrastructure and resources are not utilized nor allocated simultaneously to mutually-distrusting slices.

The mitigations to side-channel attacks can be applied across the various constituent components of a 5G network including the radio access network (RAN), transport and wide area network (WAN), mobile core, and cloud portions. Applications of the present principles can advantageously leverage the flexibility and cost-savings of the shared underlying 5G network infrastructure without compromising security for slices against side-attacks or requiring the use of dedicated resources.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Furthermore, the claimed subject matter is not limited to implementations that solve any or all disadvantages noted in any part of this disclosure. It will be appreciated that the above-described subject matter may be implemented as a computer-controlled apparatus, a computer process, a computing system, or as an article of manufacture such as one or more computer-readable storage media. These and various other features will be apparent from a reading of the following Detailed Description and a review of the associated drawings.

DESCRIPTION OF THE DRAWINGS

FIG. 25 is a simplified block diagram of an illustrative computer system that may be used at least in part to implement the present resistance to side-channel attacks on 5G network slices.

Like reference numerals indicate like elements in the drawings. Elements are not drawn to scale unless otherwise indicated.

Figure 1:
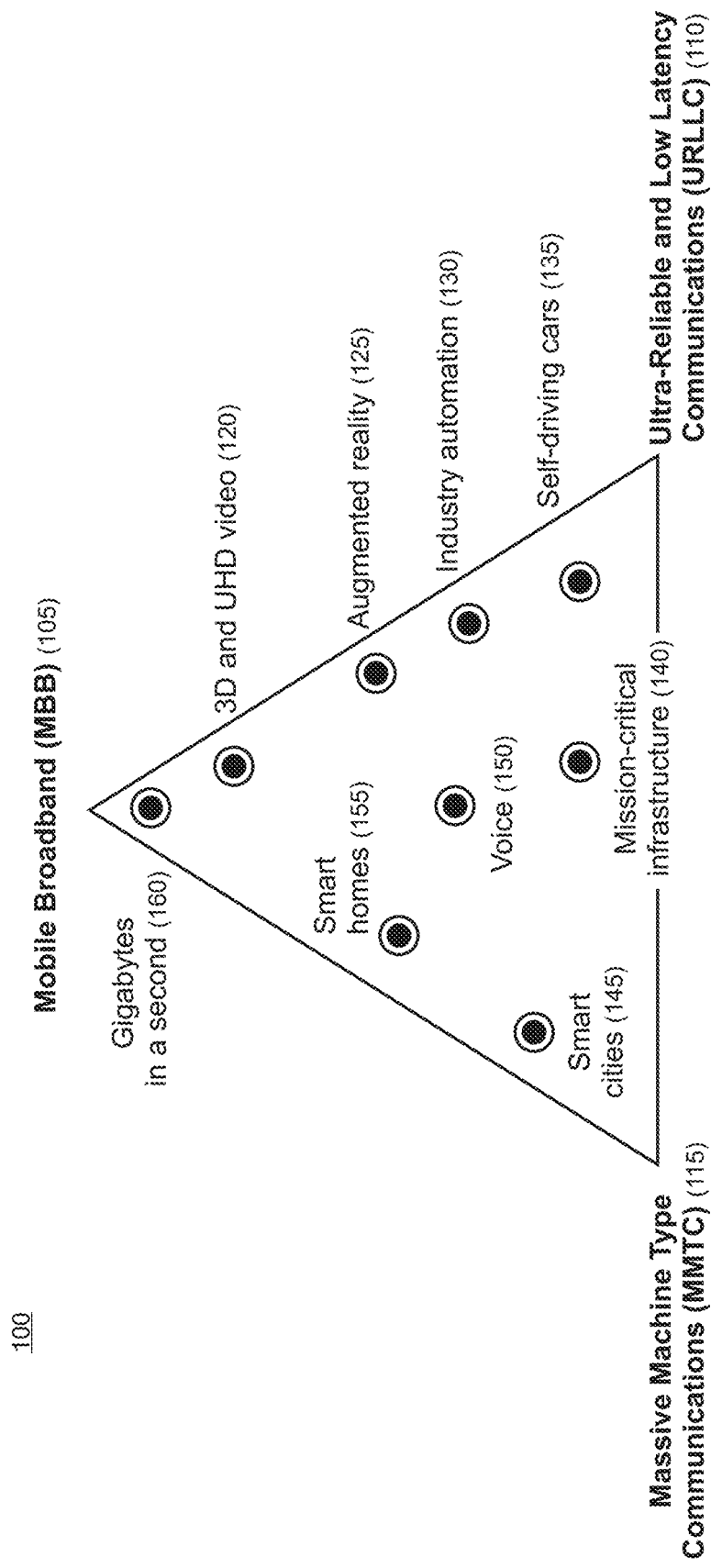
FIG. 1 shows illustrative 5G network usage scenario examples.

DETAILED DESCRIPTION 5G mobile networks utilize a service-based architecture that supports data connectivity and services enabling deployments using techniques such as, for example, network function virtualization (NFV), software-defined networking (SDN), and cloud computing. Some exemplary features and concepts of 5G networking include separating User Plane (UP) functions from Control Plane (CP) functions to enable independent scalability, evolution, and flexible deployment across, for example, centralized locations and/or distributed (i.e., remote) locations. The functional design of 5G networks is modularized to enable flexible and efficient network slicing. Dependencies are also minimized between the Radio Access Network (RAN) and the Core Network (CN). The 5G architecture is thus defined as a converged core network with a common AN-CN interface which integrates different Access Types, for example 3GPP (3rd Generation Partnership Project) access and untrusted non-3GPP access such as WiMAX, cdma2000®, WLAN, or fixed networks.

The International Mobile Telecommunications (IMT) recommendation for 2020 from the International Telecommunication Union Radiocommunication Sector (ITU-R M.2083-0) envisions usage scenarios for 5G networks that include: Mobile Broadband (MBB), as indicated by reference numeral 105; Ultra-Reliable and Low Latency Communications (URLLC) 110; and Massive Machine Type Communications (MMTC) 115, as shown in the usage scenario footprint 100 in FIG. 1.

The MBB usage scenario 105 addresses the human-centric use cases for access to multi-media content, services, and data. The demand for mobile broadband will continue to increase, leading to enhanced Mobile Broadband. The enhanced MBB usage scenario will come with new application areas and requirements in addition to existing MBB applications for improved performance and an increasingly seamless user experience. The enhanced MBB usage scenario may cover a range of cases, including wide-area coverage and hotspot, which have different requirements.

For the hotspot case (i.e., for an area with high user density), very high traffic capacity is needed, while the requirement for mobility is typically low and user data rate is higher than that of wide-area coverage. For the wide-area coverage case, seamless coverage and medium to high mobility are desired, with much improved user data rate—20 Gbps for download and 10 Gbps for upload—compared to existing data rates. However, the data rate requirement may be relaxed compared to hotspot.

The URLLC usage scenario 110 may typically have relatively stringent requirements for capabilities such as latency and availability. For example, latency in the RAN may be expected to be less than 1 ms with high reliability. Some examples include wireless control of industrial manufacturing or production processes, remote medical surgery, distribution automation in a smart grid, transportation safety, etc.

The MMTC usage scenario may be characterized by a very large number of connected devices such as Internet of Things (IoT) devices with hundreds of thousands of connected devices per square kilometer. MMTC may also be referred to as "Massive IoT" (MIoT) in some 5G literature. Such connected devices can be expected to transmit a relatively low volume of non-delay-sensitive data. Devices are typically required to be low cost and have a very long battery life.

Illustrative applications for 5G networking are also shown in FIG. 1. The applications can fall within the usage scenario examples 100 at different locations depending on a given balance of application networking requirements. As shown, the illustrative applications can include three-dimensional and/or ultra-high-definition (3D and UHD) 120; augmented reality 125; industry automation 130; self-driving cars 135; mission-critical infrastructure 140; smart cities 145; voice 150; smart homes 155; and gigabytes in a second 160.

It is emphasized that the ITU expects additional 5G usage scenarios and applications to emerge, and 5G network operators may not necessarily be limited to or required to support any particular usage scenarios or pre-defined slice types. Similarly, application and service providers may be expected to leverage the higher speeds and lower latency of 5G to develop feature-rich capabilities for all kinds of connected devices (both fixed and mobile), deliver compelling user experiences across a range of computing devices and platforms, and further realize the potential of artificial intelligence (AI) and IoT in a way that current connectivity prohibits.

With 5G, mobile networks can be optimized as features such as network slicing become available for both operators and enterprises deploying 5G infrastructure. A network slice is a logical (i.e., virtual) network customized to serve a defined purpose, type/class of service, quality of services (QoS), or dedicated customers. A 5G network slice may be dynamically created consisting of an end-to-end composition of all the varied network resources and infrastructure needed to satisfy the specific performance and requirements of a particular service class or application that may meet some pre-defined service level agreement (SLA). Each portion of the 5G network is respectively sliced such that the network can be viewed as being composed of air interface slices, RAN slices, mobile core slices, cloud slices, etc. 5G network slicing thus enables creation of multiple logical and secure networks that are isolated from each other, but which span over the same common physical network infrastructure.

5G network slices may consist of resources composed into an end-to-end service delivery construct. These may include physical resources, either a share or profile allocated to a slice, or dedicated physical resources in some cases. Slices also consist of logical entities such as configured network functions, management functions, VPNs (virtual private networks), etc. Resources (physical or logical) can be dedicated to a 5G network slice, i.e., separate instances, or they may be shared across multiple slices. These resources are not necessarily all produced within the mobile network provider as some may comprise services consumed from other providers, facilitating, for example, aggregation, cloud infrastructure, roaming, etc.

Figure 2:
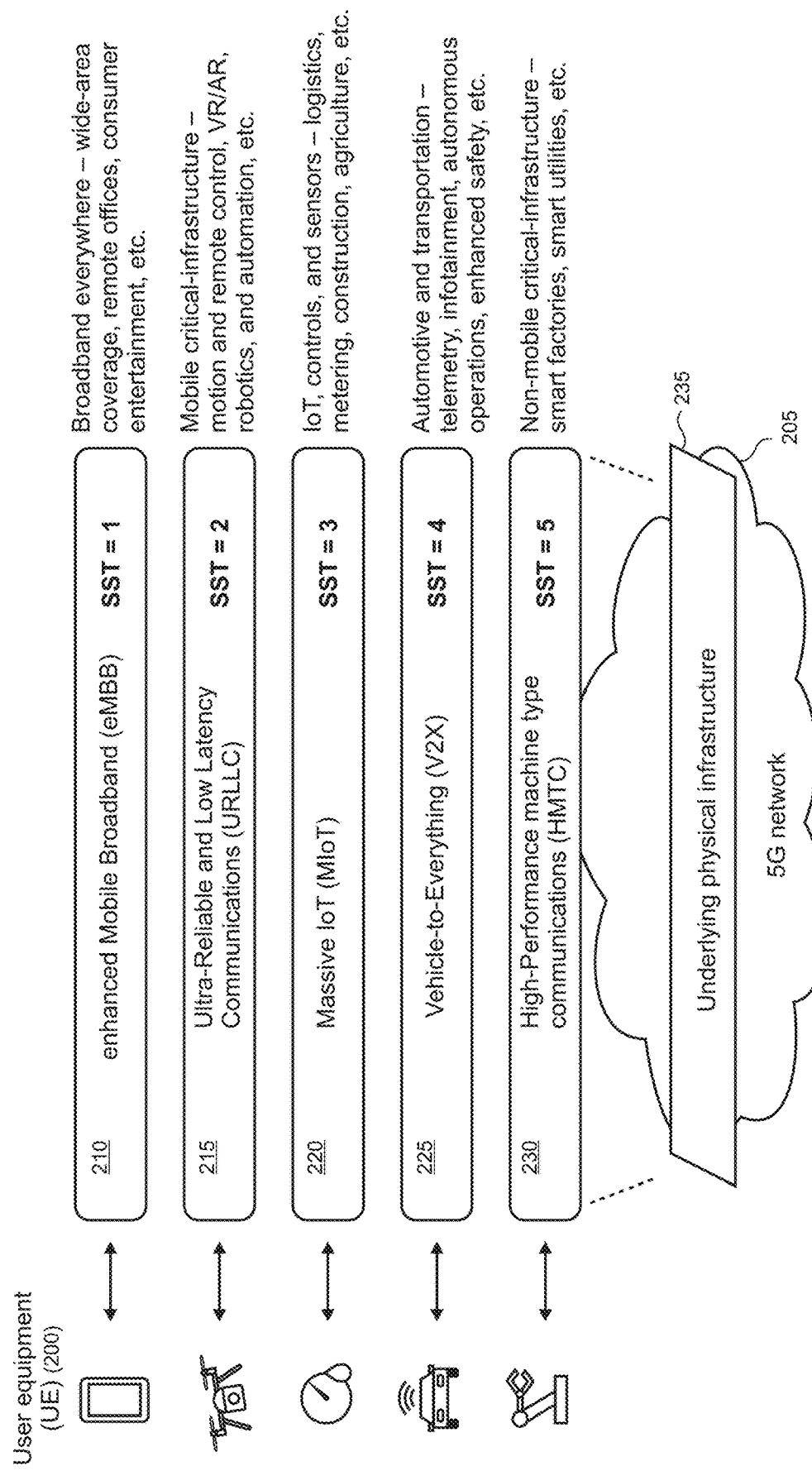
FIG. 2 shows illustrative standardized 5G network slices.

3GPP is the principal standards organization engaged in the architecture development for 5G. Several iterations of standards releases have established a foundation for the current phase of slice-specific definition. The 3GPP R15 System Architecture (3GPP TS 23.501) currently defines standard service-based Slice/Service types (SST). As shown in FIG. 2, the standardized 3GPP network slices of a 5G network 205 include eMBB (enhanced Mobile Broadband) (SST=1), URLLC (SST=2), and MIoT (SST=3) which correspond to the usage scenarios described by ITU-R 2083-0. Additional standardized SST values for V2X (Vehicle-to-Everything) (SST=4) and HMTC (High-Performance Machine Type Communications (SST=5) are also defined by 3GPP. It may be appreciated that slice service types beyond those having standardized SST values can be defined.

The five standardized or pre-defined service types for 5G network slices are respectively indicated by reference numerals 210, 215, 220, 225, and 230 in FIG. 2. IMT-2020 describes the concept of network slicing as supporting a wide variety of requirements in UE and application services using a network where multiple logical network instances tailored to the requirements can be created. Network slicing allows the 5G network operator to provide dedicated logical networks (i.e., network slices) with customer specific functionality. The 5G architecture enables different network configurations in different network slices.

A network slice can be dedicated to different types of services and span all the domains of the underlying physical infrastructure 235, such as the transport network supporting flexible locations of functions, dedicated radio configurations or specific radio access technologies (RATs), and the mobile core network. Network slices can also be deployed across multiple operators. Slices can share common physical infrastructure or may have dedicated resources and/or functions in some cases. Different types of network slices can be composed of not only standardized network functions but also some proprietary functions that may be provided by different operators or third parties.

Standardized SST values and pre-defined slice types provide a way for establishing global interoperability for 5G network slicing so that operators can efficiently support key industry verticals—for example, industrial automation, healthcare, entertainment, transportation, manufacturing, energy, agriculture, construction, security, etc.—for the most commonly used pre-defined Slice/Service Types. Additional customization and/or specialization for applications and services may be implemented for specific usage scenarios. A UE may provide Network Slice Selection Assistance Information (NSSAI) parameters to the network to help it select a RAN and a core network part of a slice instance for the device. A single NSSAI may lead to the selection of several slices. NSSAI consists of Session Management NSSAIs (SM-NSSAI), which each include an SST and possibly a Slice Differentiator (SD). SST may refer to an expected network behavior in terms of features, e.g., broadband or IoT, while the SD can help in the selection among several slice instances of the same type. It is noted that services supported in a standardized pre-defined slice may also be supported by other pre-defined slices having other (i.e., non-standard) SST values.

FIG. 2 shows user equipment (UE) 200 that may be representative of the wide variety of device types that may utilize 5G networking including, for example and not by way of limitation, smartphones and computing devices, drones, robots, process automation equipment, sensors, control devices, vehicles, transportation equipment, tactile interaction equipment, virtual and augmented reality (VR and AR) devices, industrial machines, and the like. The standardized slices can be respectively mapped to such UE types in typical usage scenarios to optimize network utilization and user experiences, but 5G network slicing is designed for flexibility to meet demand across a wide spectrum of device types and diverse applications and services. The network softwarization provided by SDN and NFV paradigms in 5G enables network slice configuration—i.e., how various physical infrastructure and network resources are deployed—to be rapidly and dynamically adapted to ensure that performance objectives are continuously met for 5G applications across a given population of UEs.

As shown, the configuration of eMBB slice 210 may be optimized for broadband-everywhere usage scenarios across a wide coverage area for applications such as consumer entertainment (e.g., video, gaming, streaming), remote offices, etc., where maximized network speeds and data rates are desired and high traffic volumes are typically experienced. The URLLC slice 215 may be configured for mobile critical-infrastructure low-latency usage scenarios including applications such as remote control operations in medical and industrial environments, VR and AR, robotics and automation, etc.

The MIoT slice 220 may be configured for optimal handling of IoT, control, and sensor applications relating to logistics, construction, and metering in vertical industries such as construction and agriculture. The V2X slice 225 may be optimized for automotive and transportation applications such as telemetry, infotainment, autonomous operations, enhanced safety, and the like. The HMTC slice 230 is typically configured for optimal handling of non-mobile/fixed critical-infrastructure applications such as smart factories, smart utilities, etc.

Figure 3:
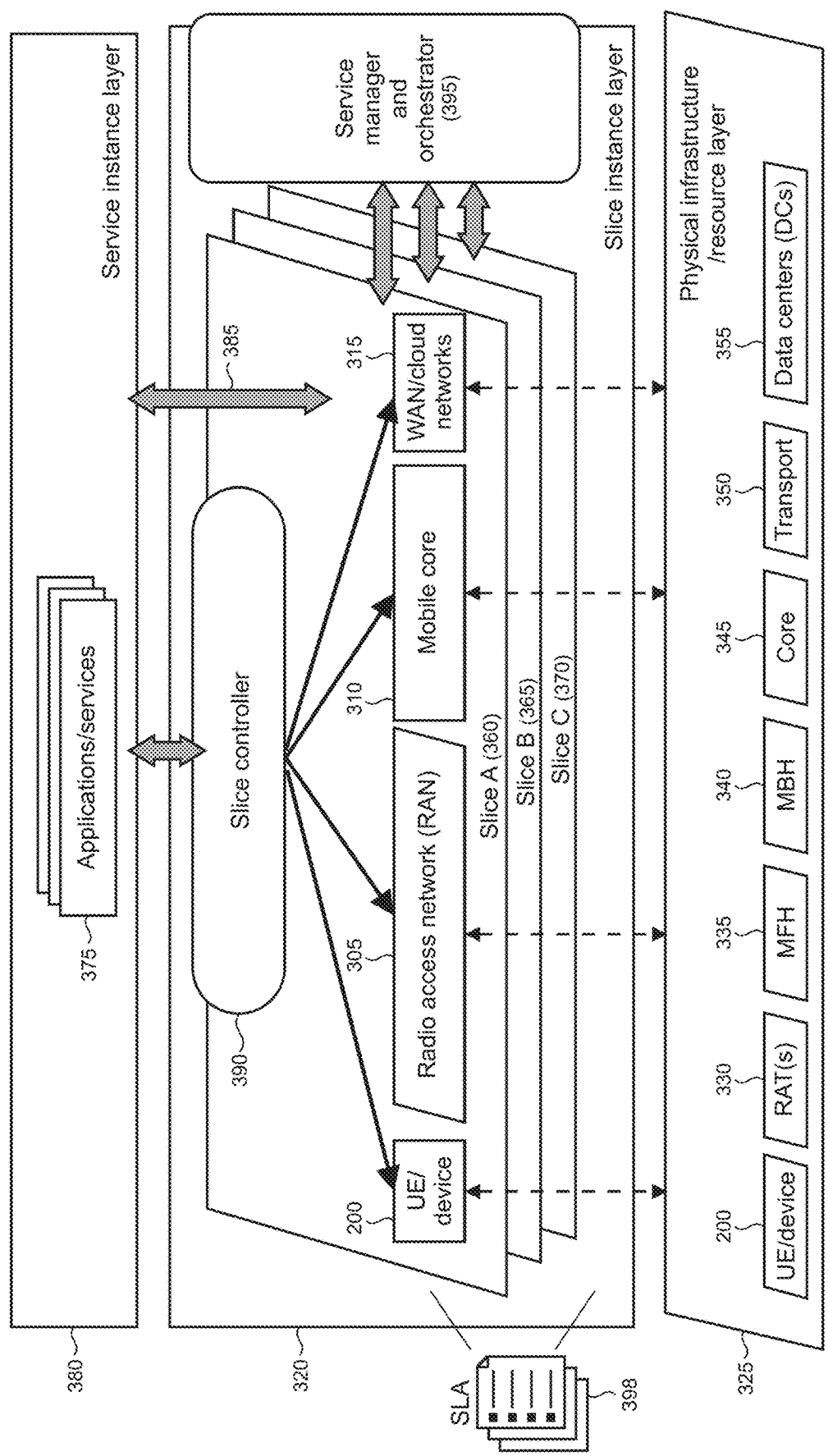
FIG. 3 shows an illustrative layered 5G network slicing framework.

FIG. 3 shows an illustrative layered 5G network slicing framework 300 that is described in the IMT-2020 recommendation. The framework comprises a RAN 305, mobile packet core 310, and wide area network (WAN)/cloud networking components 315 that are logically represented in a network slice instance layer 320 that sits above a physical infrastructure layer 325 in the framework. The physical infrastructure layer provides an abstraction of radio, compute, network, and storage resources which may include, for example, one or more RATs 330, mobile fronthaul (MFH) 335, mobile backhaul (MBH) 340, mobile core network 345, transport network (TN) 350, and one or more datacenters (DCs) 355. In some cases, one or more UE instances may be implemented as resources.

In this illustrative example, the slice instance layer includes three 5G network slices—Slice A 360, Slice B 365, and Slice C 370, but more or fewer slices may be utilized in any given implementation at any given time. These slices may include one or more of the pre-defined slice types shown in FIG. 2 and described in the accompanying text or may comprise different slice types.

Slices may be isolated by logically or physically isolating their underlying resources. The slices can support instances of various applications and/or services (collectively indicated by reference numeral 375) in a service instance layer 380, for example, using an application programming interface (API), as representatively indicated by reference numeral 385. Each network slice may be viewed as an independent logical collection of resources which can dynamically vary in configuration from slice to slice as needed to meet pre-defined technical characteristics (e.g., throughput, latency, reliability, etc.) and/or business characteristics as required by an application/service instance.

A slice controller 390 is utilized with the slicing framework 300 to maintain awareness of the application requirements to responsively allocate and manage the virtualized network functions and resources in each slice. A service manager and orchestrator 395 combines the necessary resources and functions to produce a network slice instance. Its main tasks include creation of slice instances upon the underlying physical infrastructure, dynamically mapping network functions to slice instances to meet changing context, and maintaining communication between the application and services and the framework to manage slice lifecycle.

As shown, a service level agreement (SLA) 398 is typically applicable to each of the slices 360, 365, and 370. The applicable SLAs can vary in scope and composition. The slice controller 390 may be advantageously utilized to perform resource allocation among RAN slices to meet the connectivity requirements while ensuring compliance with applicable SLA guarantees in some cases.

An SLA may be defined as a contract between the provider of a service and its internal or external end-user or customer that defines what services the provider will offer and the level of performance it must meet as well as any remedies or penalties should the agreed-upon levels not be realized. According to the ITU, an "SLA is a formal agreement between two or more entities that is reached after a negotiating activity with the scope to assess service characteristics, responsibilities and priorities of every part." SLAs typically establish customer expectations for a provider's performance and quality.

Various types of customers can be supported using 5G network slicing, typically depending on applicable circumstances and context. For example, customers may include, but are not limited to consumers (i.e., end users), businesses, enterprises, organizations, service providers, application developers, application providers, mobile network operators, internet service providers, and the like. A customer may support its own services to customers (e.g., end users) as well as services sourced from multiple different third-party providers. For example, one third-party provider may offer services to customers on one particular network slice while another third-party provider offers services on another network slice. Each discrete service offering may have its own corresponding distinct SLA.

SLA terms may include metrics covering technical aspects of service, for example describing a level and volume of communication services and which measure the performance characteristics of a provided service. Such technical metrics may include but not be limited to, for example, availability, throughput, latency, bit/packet error rate, and energy. SLAs may also include business, economic, and legal terms covering the agreement between the service provider and the customer. SLAs for different service and slice types can vary. For example, some slice types have more elasticity with regard to RAN resource allocation where resources can be readily adjusted depending on resource demand. Other slice types may be more inelastic. For example, the URLLC slice type may require strict resource allocation to guarantee reliability and low latency under a corresponding SLA, while enhanced MBB resources may be readily scaled downward once the edge cloud buffering is complete.

Figure 4:
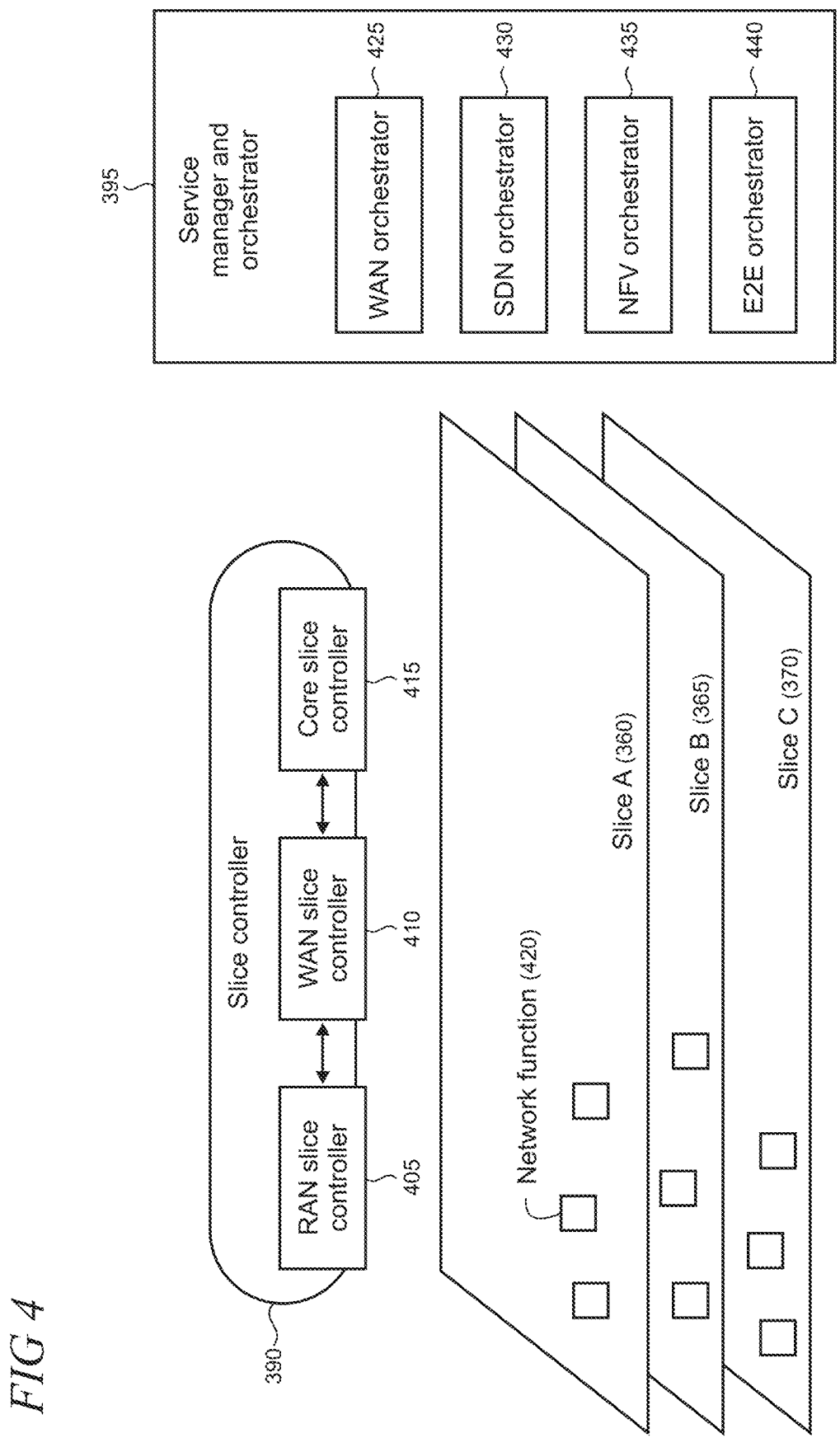
FIG. 4 shows illustrative details of a slice controller and service manager and orchestrator.

FIG. 4 shows illustrative details of the slice controller 390 and service manager and orchestrator 395. The slice controller may include constituent slicing components including a RAN slice controller 405, a WAN slice controller 410, and a core slice controller 415. Typically, the individual controllers are instantiated as SDN (software-defined networking) components. It may also be appreciated that the functionalities of the slice controllers may be combined in some cases or distributed among components in the slicing architecture differently than shown in the drawings.

Each slice controller may be particularly adapted in view of the different characteristics of the various technical domains including the RAN, core network, and transport network (e.g., WAN). Accordingly, each slice 360, 365, and 370 includes virtual network functions (representatively indicated by reference numeral 420) including, for example, radio access functions and core network functions. For example, the core network and RAN slicing related network functions are described in the 3GPP standards. Operations of the RAN slice controller are described in more detail in the text accompanying FIGS. 8 and 9. While each slice controller may perform functions independently from other systems, they may be linked to effectuate end-to-end 5G network slicing in some cases.

As shown in FIG. 4, the service manager and orchestrator 395 supports a WAN orchestrator 425 that is configured for responsibility for WAN resource control and management. An SDN orchestrator 430 provides programmatic capabilities for automating behaviors and policies in the 5G network including the control of switches and routers that support various services and applications. An NFV (network function virtualization) orchestrator 435 is responsible for network service/network function lifecycle management to deploy virtual network functions among slices for core slicing. An end-to-end (E2E) orchestrator 440 is configured to provide orchestration services for automated slicing across domains including the RAN, mobile core, and transport network.

Figure 5:
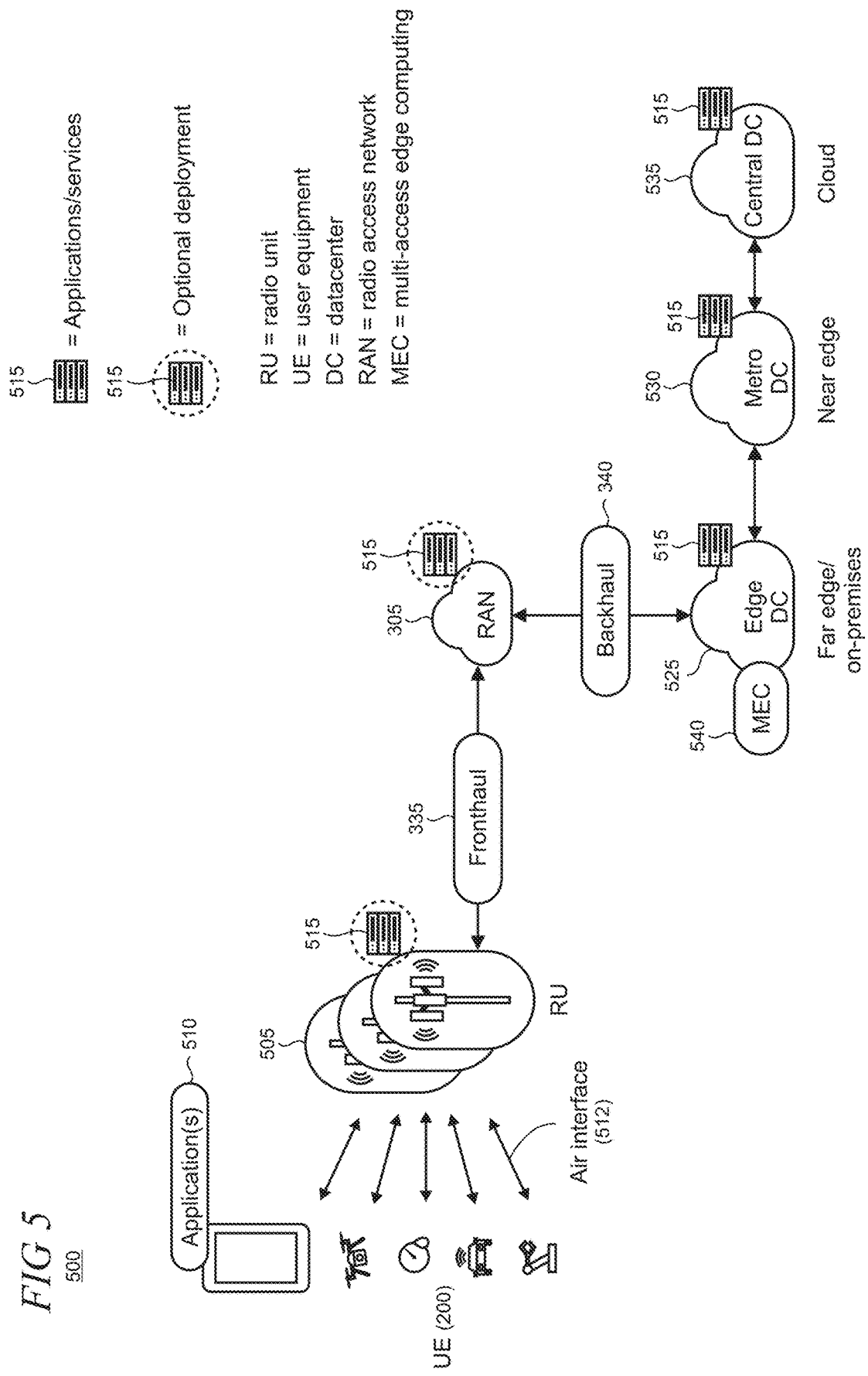
FIG. 5 shows illustrative physical infrastructure in a 5G network architecture.

FIG. 5 shows illustrative physical infrastructure in a 5G network 500. Multiple instances of a radio unit (RU) 505 are configured to interact with a diverse population of UE 200 over an air interface 512 of the 5G network. Each UE typically includes one or more local/client applications 510 or client-side software/firmware component that is arranged to interface with one or more remote application servers, service providers, or other resources (collectively indicated by reference numeral 515) and thus require network connectivity to such remote facilities.

The RUs are coupled by the mobile fronthaul 335 to a RAN 305. The RAN is coupled by the mobile backhaul 340 to one or more data centers (DCs). In this illustrative example, the DCs comprise an edge DC 525, a metro DC 530, and a central DC 535. In some networking literature, the edge DC may be referred to as a far edge or on-premises DC. The metro DC may be referred to as a near edge DC, and the central DC may be referred to as the cloud. In some implementations, the edge DC may support multi-access edge computing (MEC) functions 540.

The application servers 515 can be located at various points in the network architecture 500 to meet technical requirements and traffic demands. Typically, the application servers will be physically located closer to the UE 200 in cases where latency is sought to be minimized. However, an operator's application server location criteria may also consider factors such as management ease, scalability, and security, among other factors. In some implementations, an operator may optionally deploy application servers and other resources in the RAN 305 or RU 505, as indicated by the dashed circles in FIG. 5.

Figure 6:
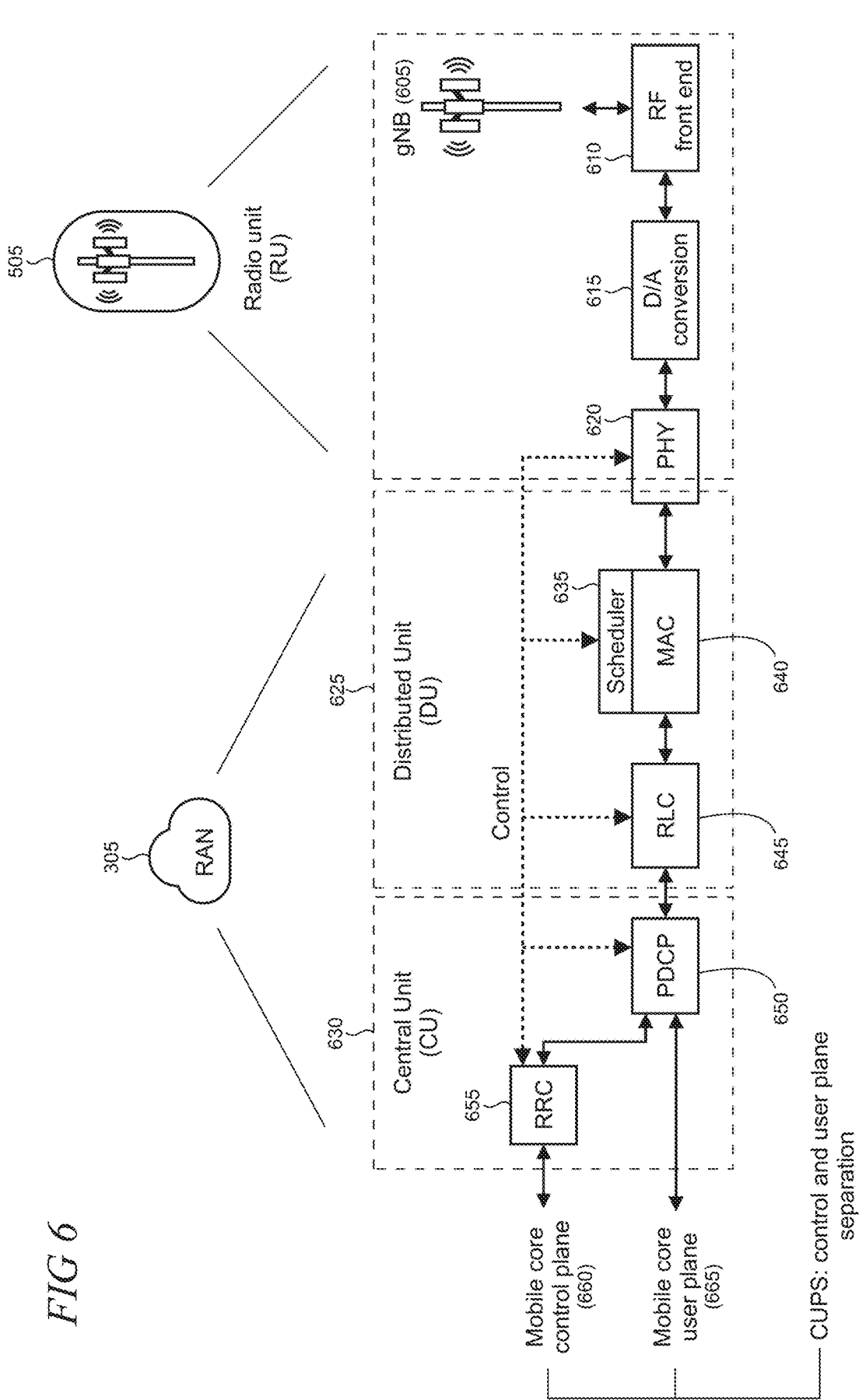
FIG. 6 shows an illustrative 5G radio access network (RAN) and radio unit (RU)

FIG. 6 shows functional blocks of the RAN 305 and RU 505. The RU comprises radio transmission points, for example, a next generation Node B, gNB 605, which handles radio communications with the UE. The gNB is serially coupled to a radio frequency (RF) front end 610, a digital to analog (D/A) conversion unit 615, and a portion of the functionality of the physical (PHY) layer 620 as described in the OSI Open Systems Interconnection model.

Under 3GPP and O-RAN (Open RAN) Alliance, the processing pipeline of the RAN 305 is split into a distributed unit (DU) 625, and a central unit (CU) 630. The DU is responsible for real-time layers 1 and 2 (L1 and L2) scheduling functions, and the CU is responsible for non-real-time, higher L2 and L3 functions. Accordingly, the DU comprises a scheduler 635 located on top of a MAC (Medium Access Control) layer component 640, an RLC (radio link control) layer component 645, and parts of a PHY (physical) layer component 620. The MAC layer component is responsible for buffering, multiplexing, and demultiplexing segments, including all real-time scheduling decisions about which segments are transmitted when. It is also able to make a "late" forwarding decision (i.e., to alternative carrier frequencies, including Wi-Fi, for example). The PHY layer component is responsible for coding and modulation.

The CU 630 is configured with a PDCP (Packet Data Convergence Protocol) layer component 650 and RRC (Radio Resource Control) layer component 655. The PDCP layer component is responsible for compressing and decompressing IP headers, ciphering and integrity protection, and making an "early" forwarding decision (i.e., whether to send the packet down the pipeline to the UE or forward it to another base station). The RRC layer component is responsible for configuring the coarse-grain and policy-related aspects of the RAN processing pipeline. The RRC layer component interfaces with the control plane 660 while the PDCP layer component interfaces with the user plane 665 to thereby implement the "CUPS" feature of 5G (control and user plane separation).

Figure 7:
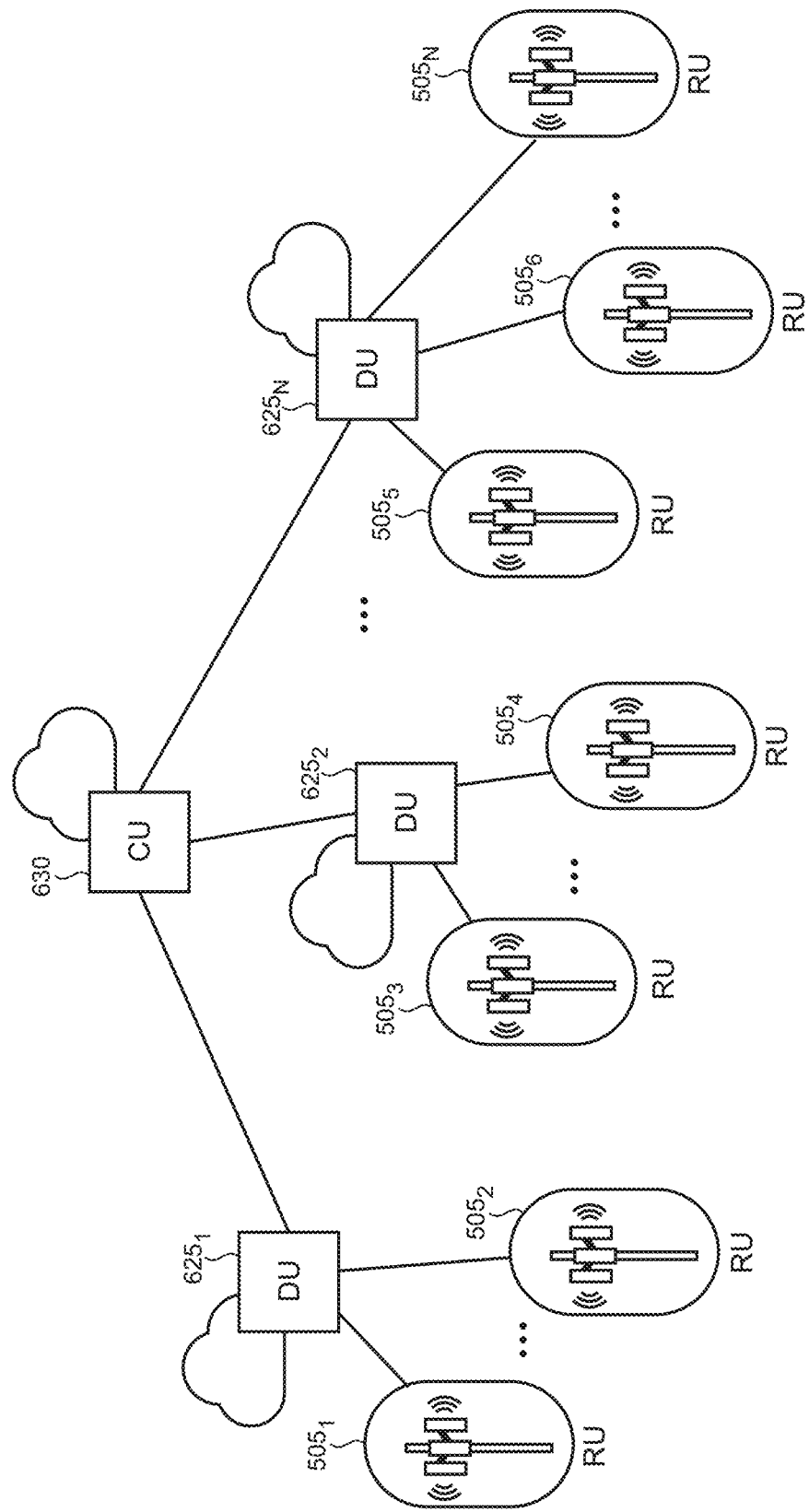
FIG. 7 shows an illustrative split-RAN hierarchy in which a central unit (CU) may support multiple distributed units (DUs) which, in turn, may support multiple RUs.

The split-RAN configuration shown in FIG. 7 enables RAN functionality to be split among physical infrastructure elements in centralized and distributed locations. For example, as shown in FIG. 7, a single CU 630 may be configured to serve multiple DUs 625, each of which in turn serves multiple RUs 505.

Figure 8:
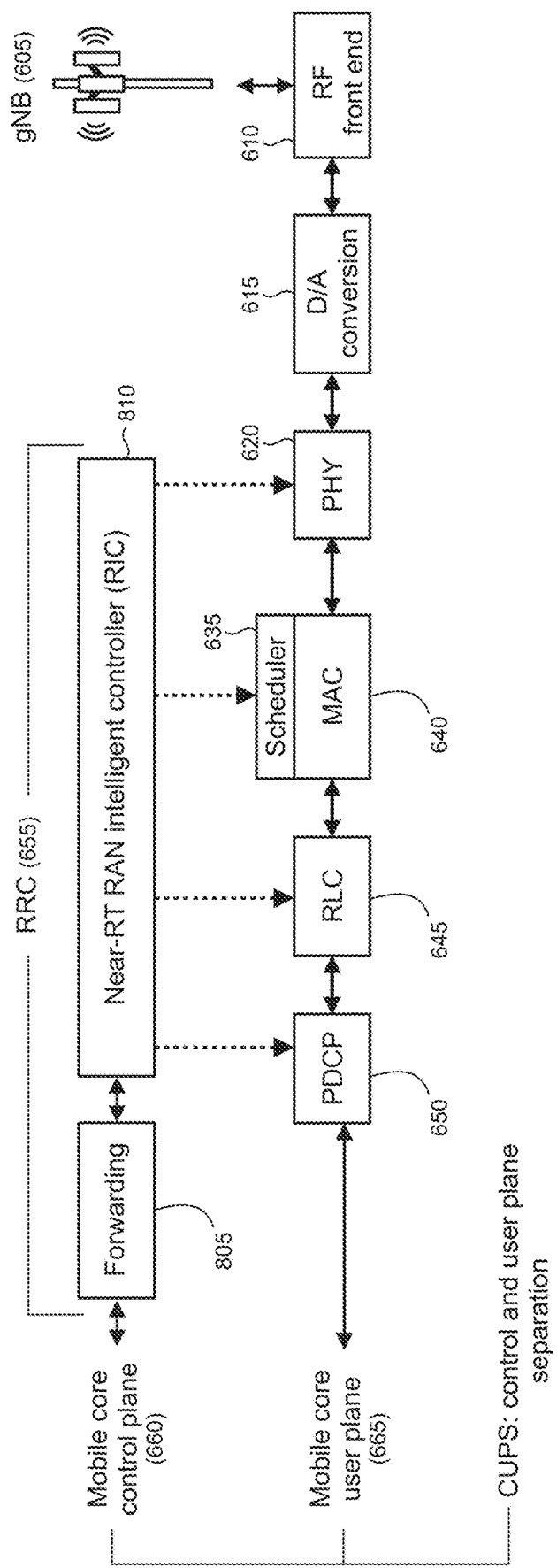
FIG. 8 shows an illustrative radio resource control (RRC) that is disaggregated into a mobile core-facing control plane component and a near-real-time RAN intelligent controller (near-RT RIC)

FIG. 8 shows that the RRC layer component 655 may be disaggregated into a mobile core-facing control plane forwarding component 805 and a near-real-time (RT) RAN intelligent controller (RIC) 810. The RRC layer component is thus responsible for only near-real-time configuration and control decision making, while the scheduler 635 on the MAC component 640 is responsible for real-time scheduling decisions.

Figure 9:
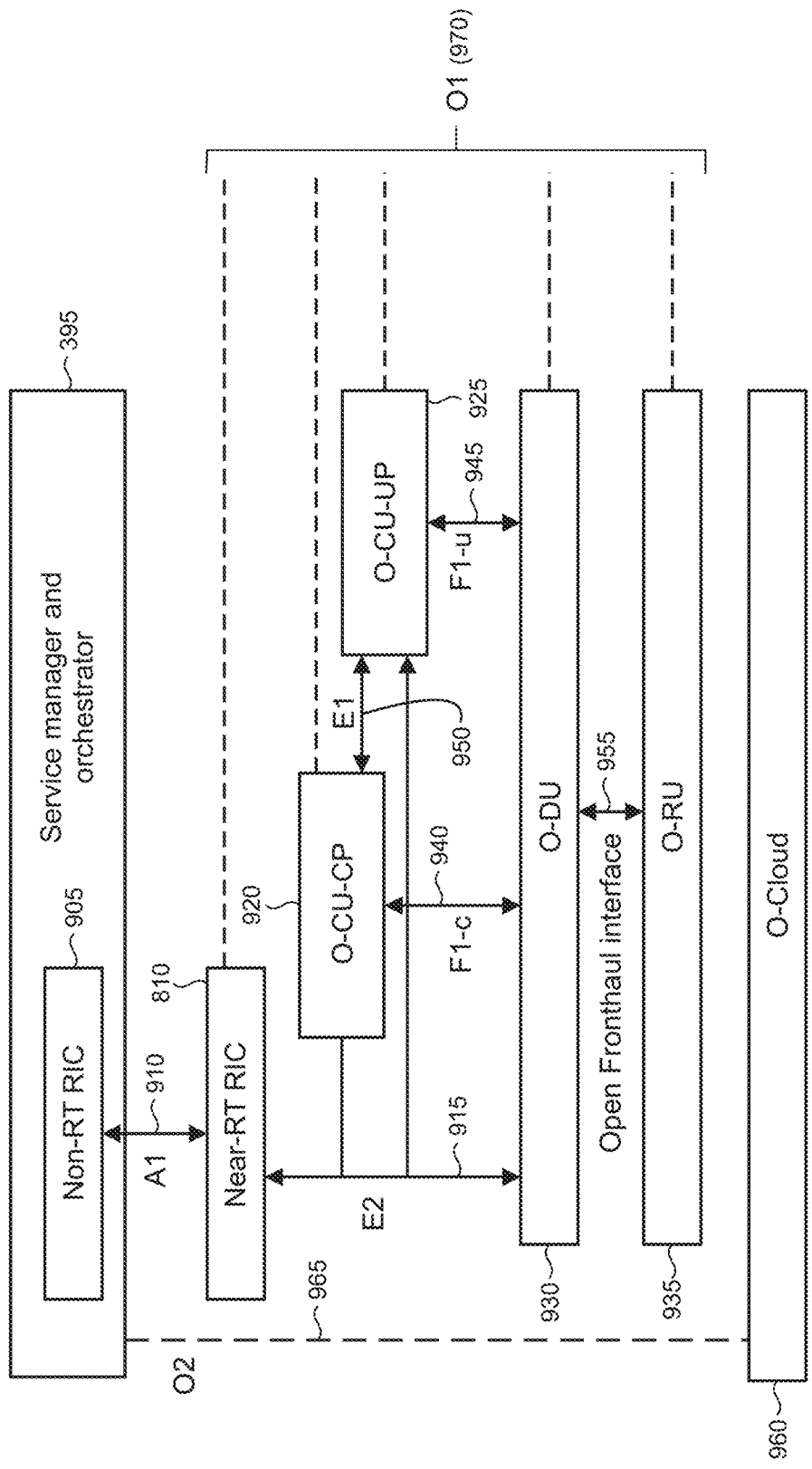
FIG. 9 shows an illustrative RAN operations and maintenance (OAM) logical architecture as described by the O-RAN Alliance.

FIG. 9 shows an illustrative RAN operations and maintenance (OAM) logical architecture 900, as described by the O-RAN Alliance. In the drawing, the "O" prefix indicates the O-RAN implementation for the functional elements of the architecture. The O-RAN Alliance defines and maintains the A1, E2, O1, O2, and Open Fronthaul interfaces discussed below. As shown, a non-RT RIC 905 may be incorporated into the service manager and orchestrator 395. The non-RT RIC interoperates with a near-RT RIC 810 through an A1 interface 910.

The near-RT RIC 810 is coupled over an E2 interface 915 with network functions for radio access for control and optimization including the O-CU-CP (O-RAN Central Unit-Control Plane) 920, O-CU-UP (O-RAN Central Unit-User Plane) 925, and O-DU 930. The O-CU-CP and O-CU-UP are respectively coupled to the O-DU over F1-c and F1-u interfaces, 940 and 945, as defined and maintained by 3GPP. The O-CU-CP is coupled to the O-CU-UP over a 3GPP E1 interface 950. The O-DU and O-RU 935 are coupled using an Open Fronthaul interface 955 (also known as the lower layer split (LLS) interface).

The O-Cloud 960 is a cloud computing platform comprising a collection of physical infrastructure nodes that meet O-RAN requirements to host the relevant O-RAN functions (i.e., near-RT RIC, O-CU-CP, O-CU-UP, and O-DU), the supporting software components (such as Operating System, Virtual Machine Monitor, Container Runtime, etc.), and the appropriate management and orchestration functions to create virtual network instances and map network functions. The O-Cloud is coupled to the service manager and orchestrator 395 over the O2 interface 965. An O1 interface 970 is provided to each of the near-RT RIC, O-CU-CP, O-CU-UP, O-DU, and O-RU, as shown in FIG. 9.

Figure 10:
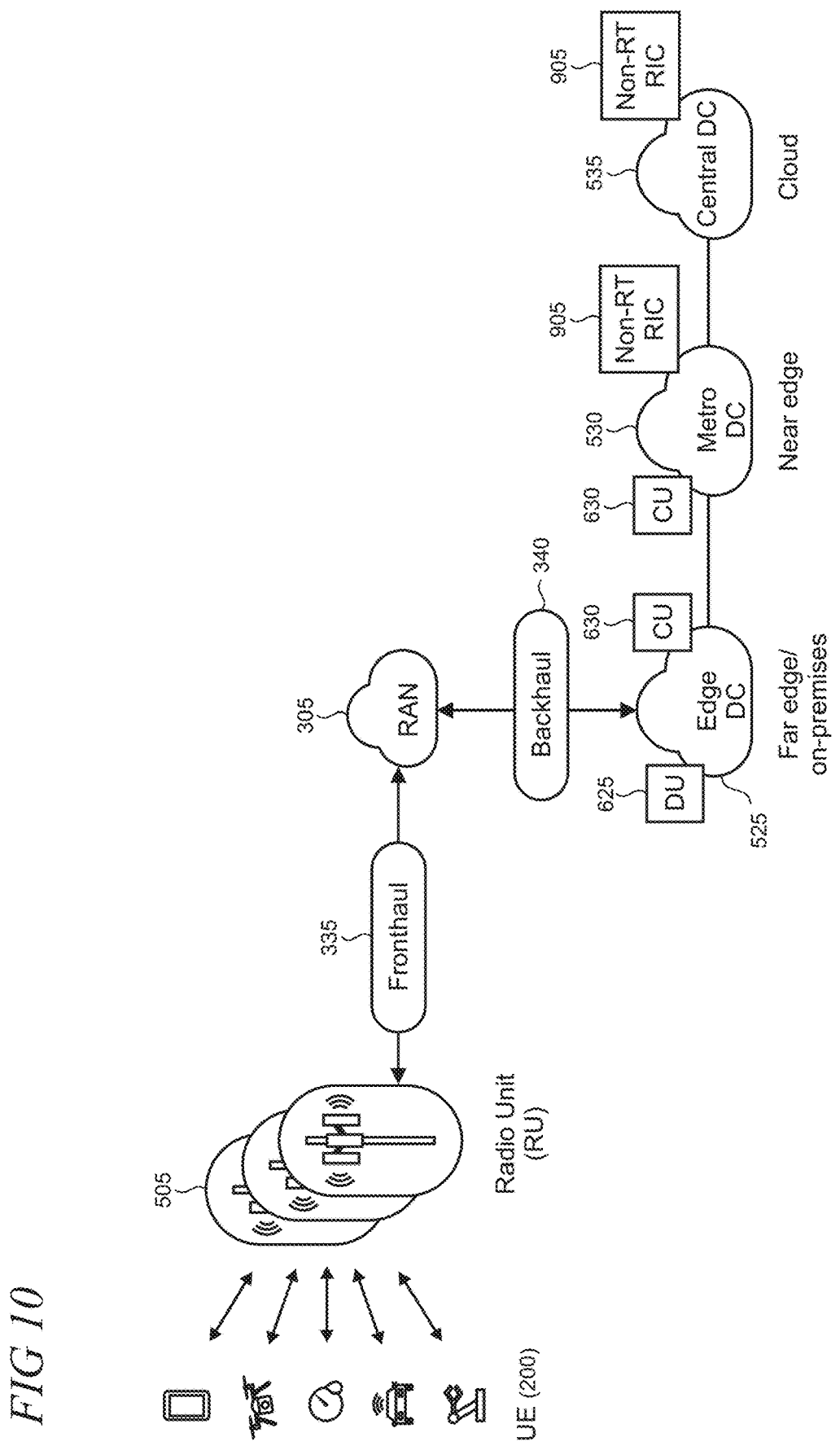
FIG. 10 shows an illustrative 5G network implementation in which split-RAN functional units and instances of the non-real-time RIC (non-RT RIC) may be distributed among physical infrastructure components.

The splitting of functional elements among the DU, CU, near-RT RIC, and non-RT RIC, as discussed above, enables flexible deployment of instances of such elements in the physical infrastructure that underlies a typical 5G network. FIG. 10 shows an illustrative implementation in which split-RAN functional units and instances of the non-RT RIC may be distributed among physical infrastructure components of a 5G network 500. For example, as shown, a DU 625 and CU 630 may be located at the edge DC 525. A CU 630 and non-RT RIC 905 may be located in the metro DC 530. The central DC 535 can also host a non-RT RIC in some cases.

Figure 11:
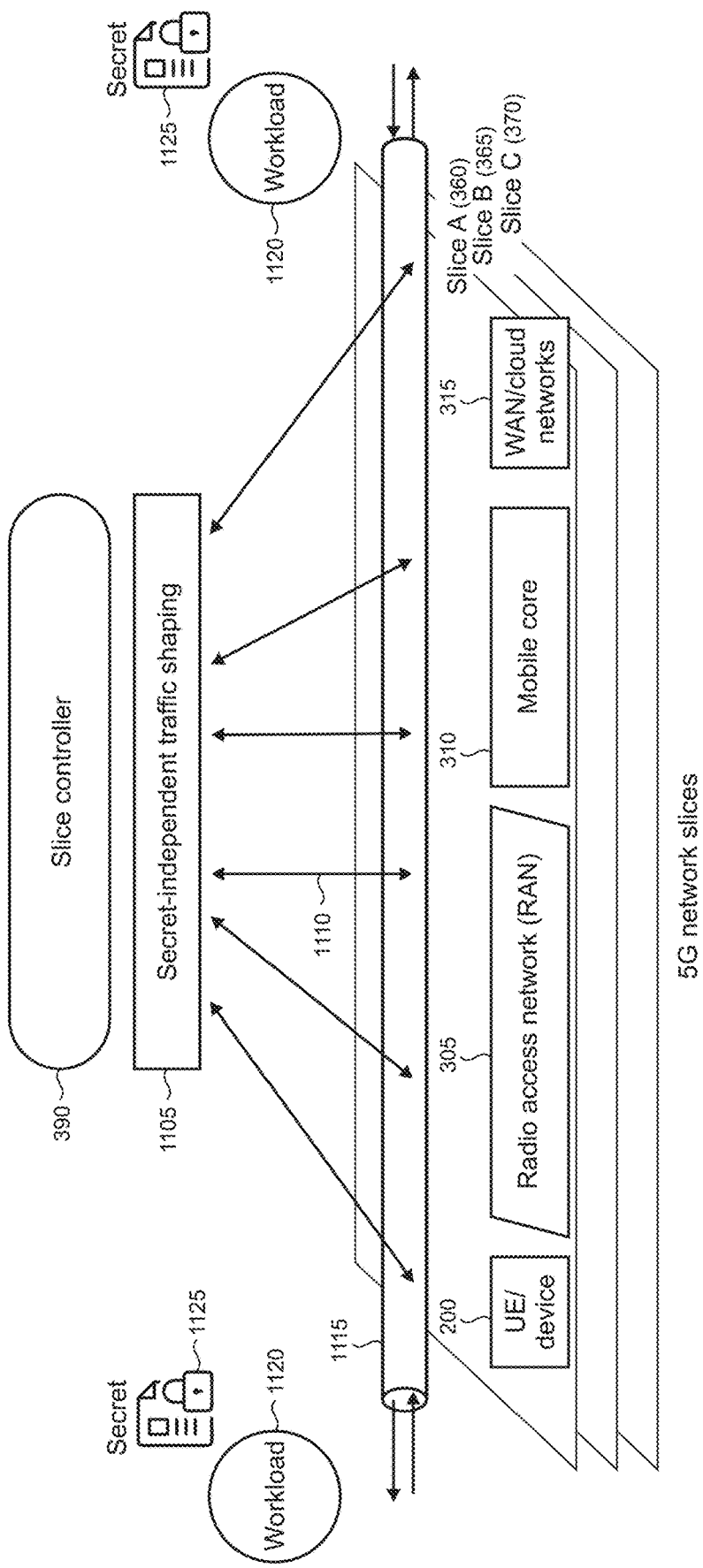
FIG. 11 shows an illustrative slice controller that is configured to perform secret-independent traffic shaping for one or more portions of a 5G network slice, or on an end-to-end basis.

FIG. 11 shows slice controller 390 as configured to perform secret-independent traffic shaping, as indicated by reference numeral 1105, for data traffic carried over for one or more portions of a slice (e.g., slices 360, 365, 370) of a 5G network 500 or for traffic carried on a slice on an end-to-end basis. The one or more portions of a 5G network slice may include, for example, the UE 200, RAN 305, mobile core 310, and WAN/cloud networks 315. The secret-independent traffic shaping may be particularly adapted for a specific 5G network portion in some cases, although the principles discussed below are generally applicable to all of the 5G network portions. As representatively indicated by arrow 1110, the secret-independent traffic shaping may be performed at one or more multiple points along a transmission path 1115 that traverses a slice, and not necessarily only at a data traffic origin and destination.

It may be appreciated that the secret-independent traffic shaping disclosed herein may be suited to slicing paradigms that are applicable to other types of shared communications network infrastructure that are currently deployed or expected to be deployed in the future. For example, emerging network concepts integrate various dimensions such as space, airborne and ocean communications infrastructure. Space-air-ground integrated network (SAGIN) infrastructure combines the benefits of satellite, aerial, and terrestrial communications. Integrated artificial intelligence and advanced SDN and NFV concepts may be further leveraged to enable advanced network slicing of such multi-dimensional heterogenous infrastructure which is referred to herein as "6G" network infrastructure. 6G networks are anticipated to support increased data rates, network capacity, and lower latency compared to services provided by the current global rollout of 5G networks and may be expected to support a diverse set of services with different QoS and SLA requirements. As with 5G network slicing, 6G network slicing enables the construction of multiple slices for different services on top of the common infrastructure. While heterogeneity of 6G networks is increased compared to 5G networks, it may be appreciated that the principles of secret-independent traffic shaping disclosed herein are equally applicable to both networks.

The data traffic in typical implementations is associated with a workload 1120 that may arise from operations of an application or service supported on the 5G network 500. The workload may include a secret 1125 that represents, for example, encryption keys, passwords, or any sensitive, confidential, or privileged data that is not desirable to be revealed to malevolent actors. The workload can arise at any point in the 5G network including egress and exit points on the network, inter-domain locations, as well as various points therebetween. For example, a WAN operator may receive 5G network traffic at an interface with a RAN operated by a mobile network operator. Secret-independent traffic shaping can be applied in the WAN operator's portion of the 5G network slice to the traffic received from the RAN in this scenario.

Secret-independent traffic shaping may comprise a variety of techniques to decouple data transmission characteristics from the workload 1120 and secret 1125. Such decoupling improves resistance to side-channel attacks which may involve an attacker, for example, observing the time it takes to perform specific operations to thereby make inferences about the workload and gain access to the secret. For example, without secret-independent traffic shaping, common operations for the workload may be arranged to take less time to execute than uncommon ones. Therefore, the attacker may be able to infer workload characteristics simply by examining latencies associated with data transmissions on the slice.

Secret-independent traffic shaping is adapted to mitigate against side-channel attacks by eliminating workload- and data-dependent slice transmissions to thereby stop leakage of timing information from the slice. In general, secret-independent traffic shaping seeks to obscure the inherent or natural patterns of data transmissions for the workload (i.e., those patterns that would occur without the application of present techniques). By purposely perturbing timing characteristics of data traffic for the workload, the natural timing distribution may be advantageously replaced by a synthetic distribution which reveals nothing about the communications, the workload, or the secret.

Figure 12:
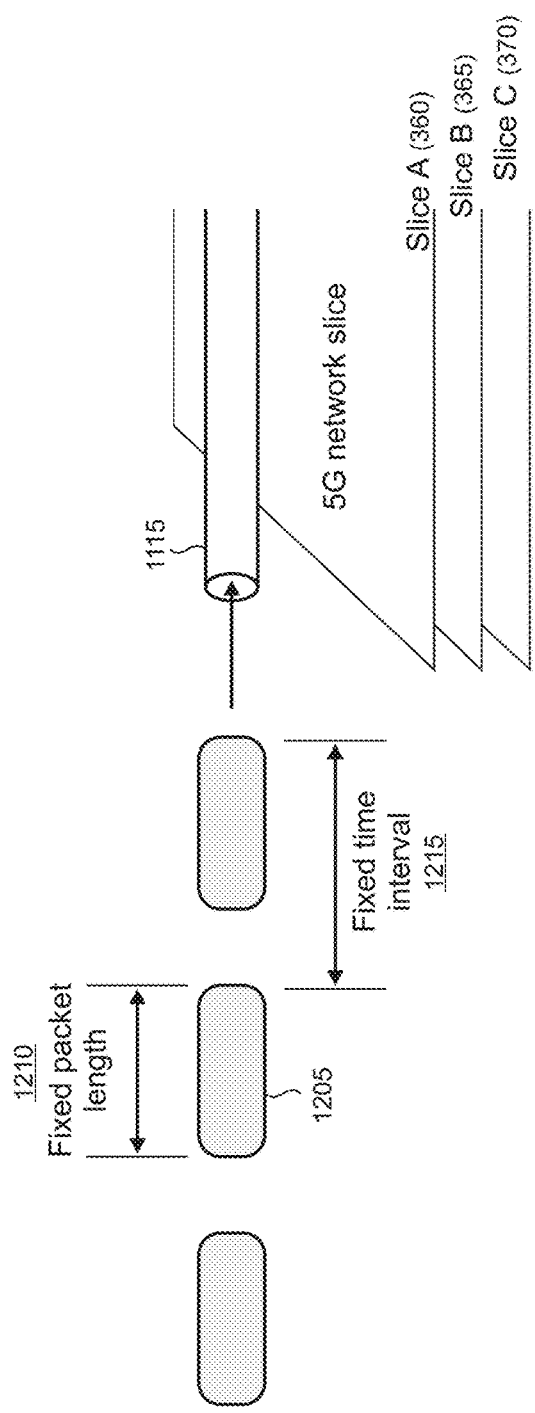
FIG. 12 shows an illustrative example of secret-independent traffic shaping utilizing fixed-length data packets at fixed time intervals in a 5G network slice.

Secret-independent traffic shaping may comprise different specific implementations to suit particular requirements for mitigations against side-channel attacks. In one illustrative implementation, as shown in FIG. 12, data packets 1205 for the workload can be transformed to be of fixed length, as indicated by reference numeral 1210. In addition, or alternatively, the slice controller can impose fixed time intervals for transmission of data packets over the slice path 1115, as indicated by reference numeral 1215.

Figure 13:
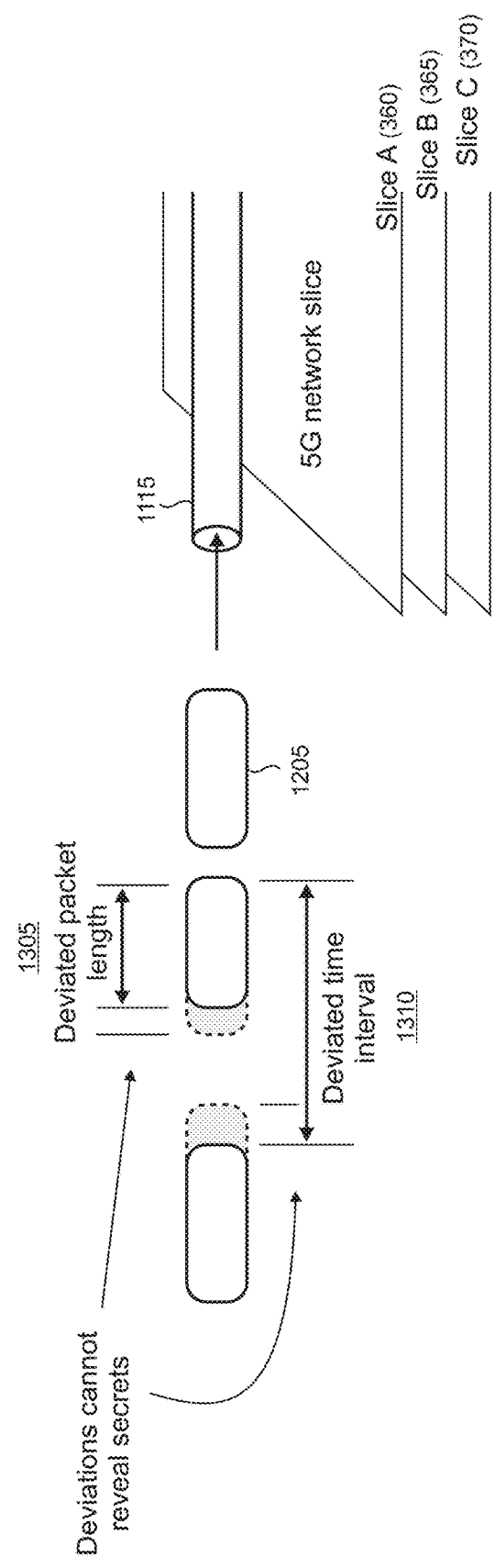
FIG. 13 shows an illustrative example of secret-independent traffic shaping utilizing fixed-length data packets at fixed time intervals in a 5G network slice in which some deviation in packet length and time interval is allowable so long as such deviations do not reveal secrets.

As shown in FIG. 13, the slice controller can perform secret-independent traffic shaping in a way that allows for some deviation of either packet length, as indicated by reference numeral 1305, and/or data transmission time interval, as indicated by reference numeral 1310. However, the degree of allowable deviation is selected to be less that some predetermined threshold to minimize timing leakage to ensure that secret information is not revealed. In some cases, the nature or type of data traffic that is associated with a given workload may indicate that some deviation of fixed packet length or timing interval is advisable, for example, to meet applicable QoS or SLA guarantees. It may be appreciated that bursty types of data traffic may be less amenable to strict fixed timing characteristics. Accordingly, some 5G services such as voice and data services may utilize secret-independent traffic shaping with some flexibility, while other services, such as streaming video, may be suitable for more strict fixed timing characteristics.

Figure 14:
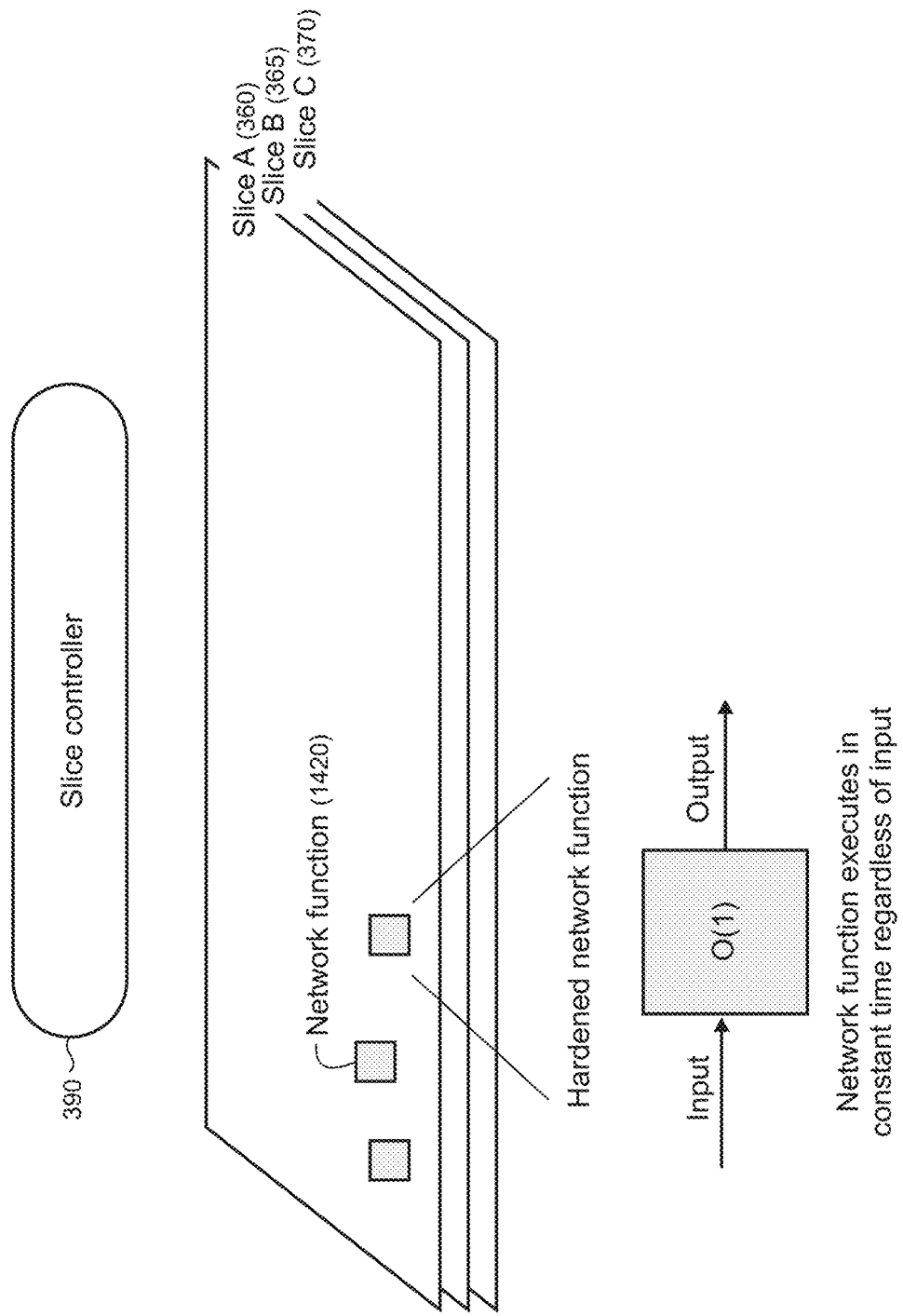
FIG. 14 shows an illustrative example of hardening virtualized network functions to execute in constant time.

FIG. 14 shows an illustrative example of hardening virtualized network functions 1420 to execute in constant time. By executing in constant time regardless of input, a hardened virtualized network function can frustrate a side-attack from a bad actor who attempts to ascertain the secret 1125 (FIG. 11) associated with a workload by observing the length of time it may take for the network function to perform a computation associated with service provisioning and/or slice operations. For example, the attacker may attempt to create contention for shared resources and then observe how the slice reacts under different levels of traffic demand and network congestion to thereby gain insights to the workload and secret. As virtualized network functions are implemented using software code, hardening may reduce input-related variable latency to remove virtualized network functions as a source of timing leaks in the slice.

Hardening of virtualized network functions may illustratively include the reduction of control flow dependence on input data. Suitable software control flow may include, for example, the use of if-conversion and predicated execution (referred to as hammocks) may be reduced and/or replaced by code control flow comprising single-entry, single-exit subgraphs. Another illustrative example of hardening may include configuring software loops to execute a constant fixed number of iterations. In some cases, time-padding and obfuscation may be written into the code to obscure workload operations when increased virtualized network function latency is tolerable. Time-padding can add some fixed delay to the code to reduce timing differences. Obfuscation may include injecting extra arbitrary operations or noise into code execution. As with secret-independent traffic shaping discussed above, the principles of hardening virtualized network functions to execute in constant time, as disclosed herein, may be applicable to both 5G and 6G networks.

Figure 15:
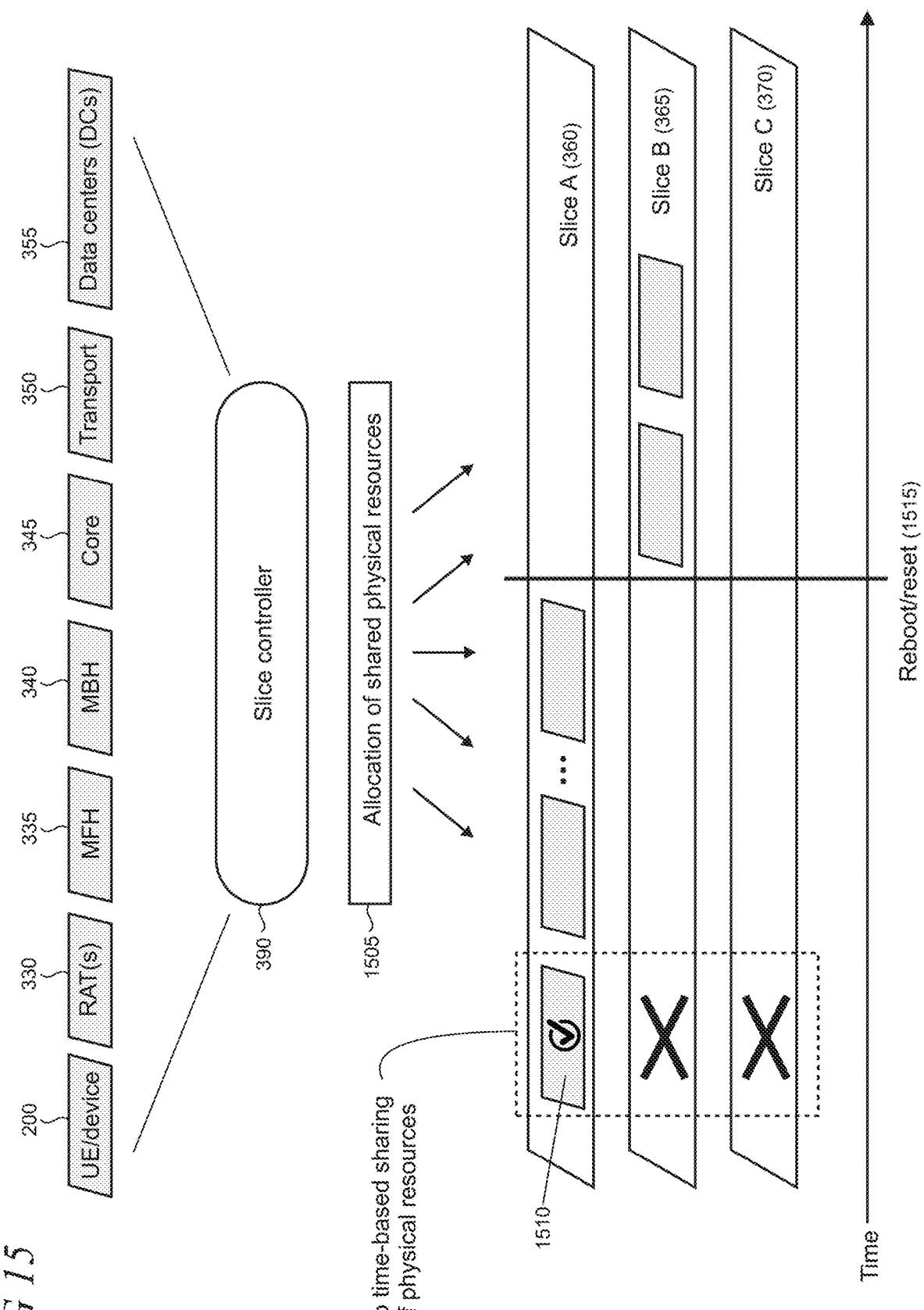
FIG. 15 shows illustrative imposition of restrictions on time sharing of physical 5G resources by different 5G network slices.

FIG. 15 shows the slice controller 390 imposing restrictions on time sharing of various physical 5G resources by different slices 360, 365, and 370 as another illustrative example of side-channel attack mitigation. The restrictions on time sharing can be imposed on any of the resources 200, 330, 335, 340, 345, 350, and 355 singly, or in any combination or sub-combination. The slice controller provides temporal isolation to each of the slices by performing allocation of the physical resources, as indicated by reference numeral 1505, so that a given resource 1510 is never shared by multiple slices simultaneously which may be mutually distrusting. Thus, as shown, the slice controller allocates the resource to Slice A while preventing Slices B and C from simultaneously using the resource. Only after Slice A completes some predetermined usage interval and relinquishes the resource, does the slice controller alternate the resource allocation to Slice B.

By restricting time sharing of physical resources among slices, the resources appear dedicated to the slice, at least during the restricted time interval, which may reduce opportunities for attackers to observe time-based characteristics of data traffic and network functions on the slice and/or attempt resource contention-based attacks. Temporal slice isolation may further be strengthened by implementing a hard reset of the resources between alternate instances of allocation, as indicated by reference numeral 1515. The reset returns the resource to some initialized state and wipes away any preexisting problematic state or malevolent code that may be executing in an attempt to compromise the slice. It may be appreciated that the principles of temporal slice isolation may be applicable to both 5G and 6G networks.

The length of time that elapses between alternating applications can vary by implementation. If the hard reset is not computationally expensive, the schedule for which resources are alternately allocated may provide for relatively frequent switching to provide fine-grained temporal isolation. This may have the benefit of maximizing slice responsiveness to customer data traffic at the cost of higher network overhead. By contrast, more coarse-gained temporal isolation while reducing overhead, may increase the chances that QoS and SLA guarantees may be missed, and may increase the size of the time window for side-attacks.

Figure 16:
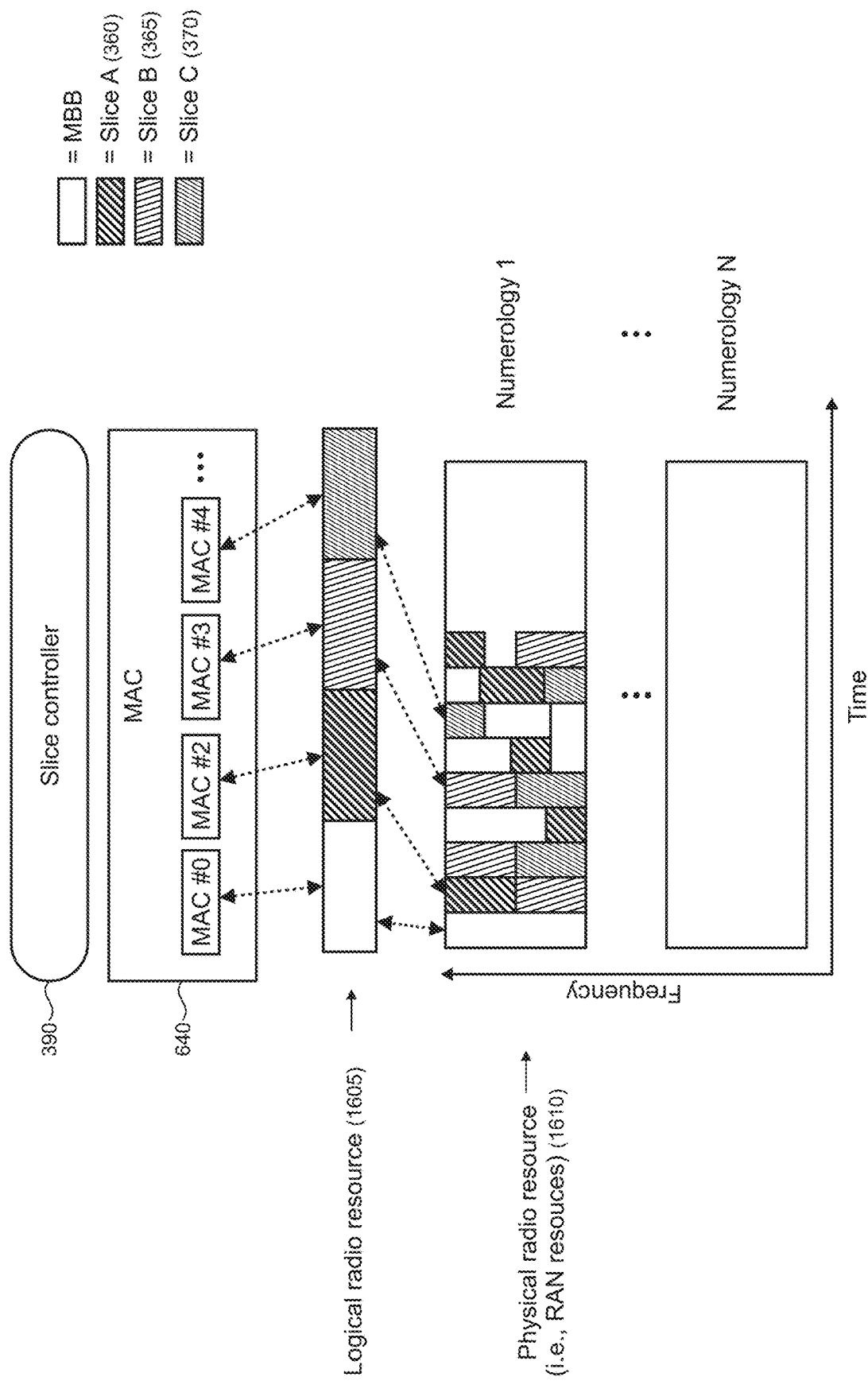
FIG. 16 shows illustrative allocation of physical radio resources among RAN slices.

FIG. 16 shows the slice controller 390 as illustratively configured to allocate physical radio resources among network slices. The slice controller 390 may be instantiated, for example, as a component of the near-RT RIC 810 (FIG. 8) to thereby implement or combine the functionality of the scheduler 635 (FIG. 6). In alternative implementations, part of the slice controller may be distributed outside the near-RT RIC, for example, in a CU in an edge or metro DC, or included in one or more other functional elements of the 5G network architecture. In some implementations, dynamically optimized RAN actions to ensure SLA guarantees may be performed in the near-RT RIC while longer term SLA assurance can be handled in the non-RT RIC.

The slice controller 390 is arranged to control operations of the MAC component 640 based on logical representations 1605 of a radio resource in the PHY component 620 (FIG. 6). As shown, the MAC component 640 performs intra-slice resource allocation. More specifically, the physical radio resource 1610 is partitioned into multiple blocks or segments each defined by one numerology to meet certain communication requirements, such as low latency, wide coverage, etc. Numerology refers to the values of the basic physical transmission parameters, particularly including, for example, the transmission-time slot length in which length of the slot is shorter for higher numerologies.

Each RAN portion of a network slice occupies a subset of physical resources taken from one or multiple numerology segments which may be represented, as shown in FIG. 16, using dimensions comprising frequency and time. In 5G, frame structures of the radio resources in the time domain are 10 ms in length irrespective of the numerology in use but may vary in width in the frequency domain. For example, a RAN slice serving automotive services in a high mobility scenario may use a wider subcarrier spacing to combat high Doppler shifts, while a RAN slice serving a latency-sensitive service such as real-time gaming may use fewer symbols in each subframe (there are 10 subframes per frame in 5G networks). It may be appreciated that spatial multiplexing, referred to as MIMO (multiple input, multiple output), may also be utilized to provide additional layers of RAN resources that the slice controller may allocate in some implementations.

Physical radio resources may be configured to further enhance security by isolating the PHY layer for the trusted slice from that of other trusted and non-trusted slices. Such isolation may be implemented, for example, by using dedicated PHY resources. For the key physical channels in the air interface of a 5G RAN, such as the physical downlink (DL) and uplink (UL) control channels, the physical random access channel and the physical shared channel, we can have slice-specific physical channels, as well as common physical channels. The common physical channels can be used by all slices, and the slice-specific physical channels are dedicated to the respective slices to thereby enable PHY resource isolation.

Figure 17:
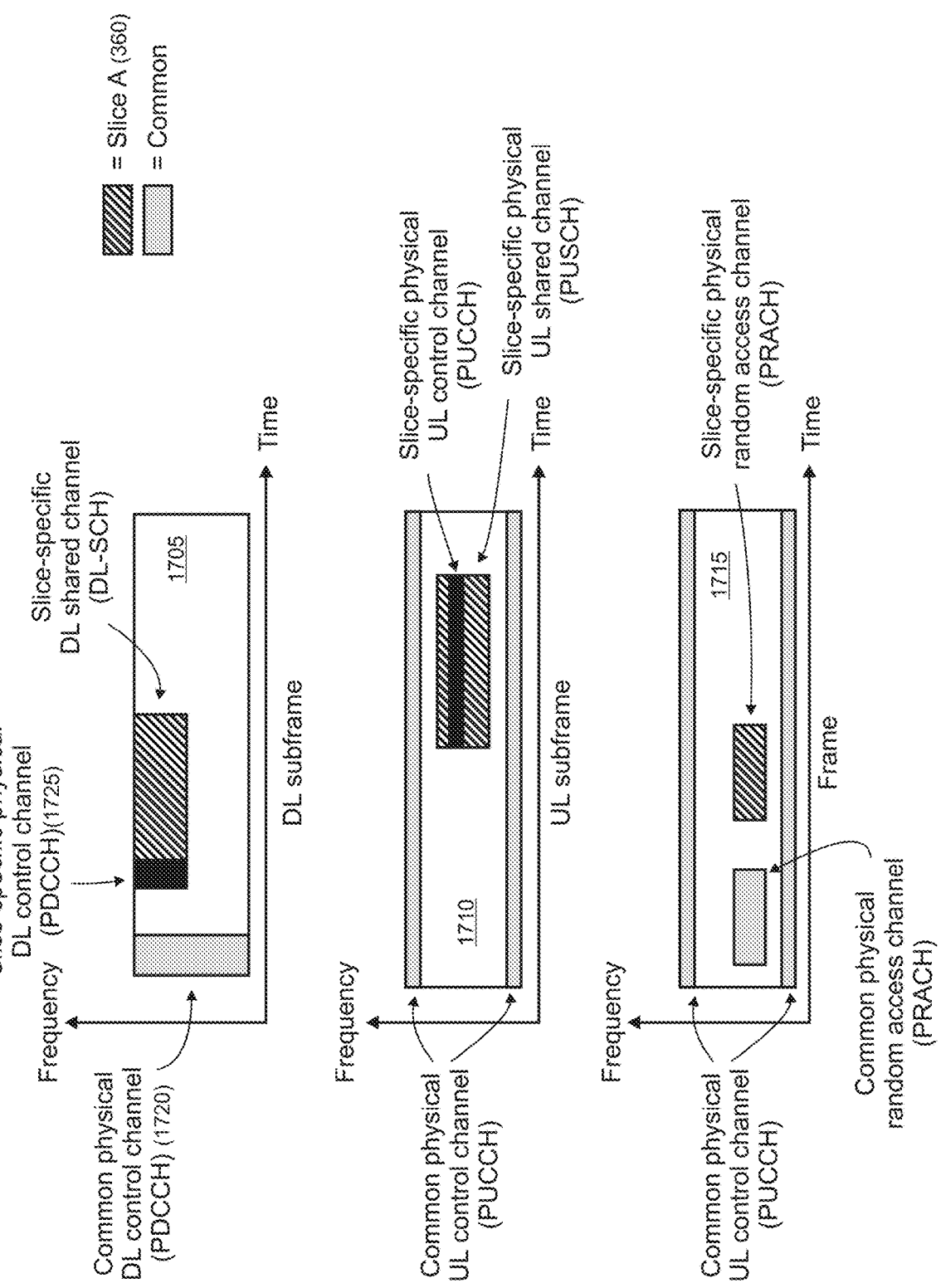
FIG. 17 shows illustrative dedicated allocation of physical radio resources to 5G network slices.

FIG. 17 shows illustrative dedicated allocation of physical radio resources 1610 (FIG. 16) on a slice-specific basis for the physical downlink control channel (abbreviated as PDCCH under 3GPP) in an exemplary DL subframe 1705, the physical uplink control channel (PUCCH) in an exemplary UL subframe 1710, and the physical random access channel (PRACH) in an exemplary frame 1715.

A common PDCCH 1720 carries resource allocation information for the network slices. A network slice identifier (sNetID) may be used to address the scheduled network slices. UE accessing a scheduled network slice can detect the common physical control information addressed to the corresponding sNetID. The slice-specific PDCCH 1725 for a network slice is located in the radio resources assigned to the network slice. The slice-specific PDCCH carries scheduling information for the UE devices in the network slice. Similarly, in the uplink, common and slice-specific physical uplink control channels can be utilized. UE accessing multiple network slices can aggregate the uplink control information and transmit it using the common physical control channel.

Figure 18:
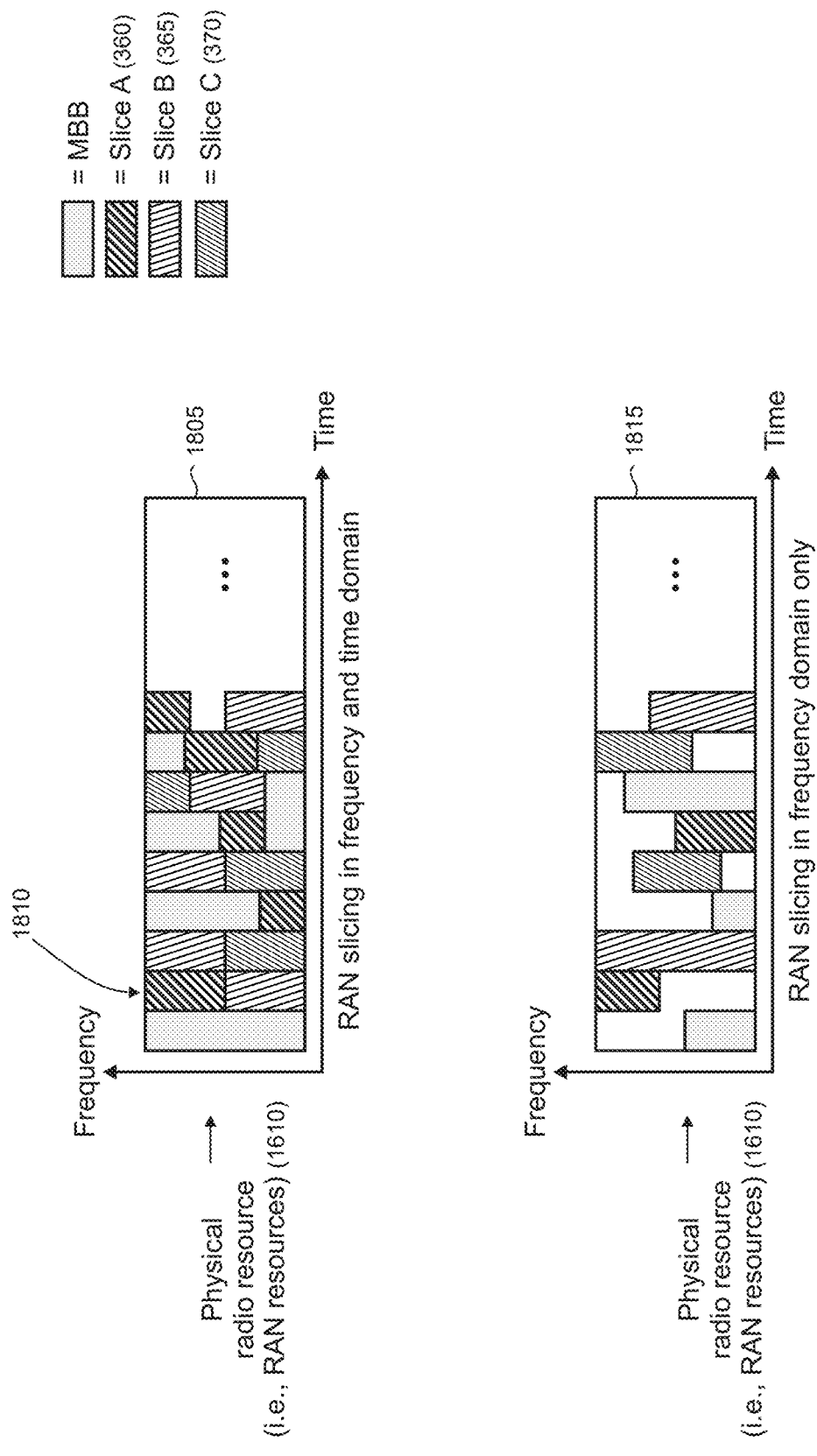
FIG. 18 shows illustrative arrangements for physical radio resource allocation in time and frequency domains, and in the frequency domain only.

PHY resources may further be isolated by limiting resource time sharing to provide temporal isolation. FIG. 18 shows illustrative arrangements for physical radio resource allocation in both time and frequency domains, and in the frequency domain only. In the first illustrative allocation 1805, radio resources are allocated to the slices in which different slices can utilize different subcarrier frequencies at the same time. For example, both Slice A and Slice B are allocated resources in the second time slot 1810. In the second illustrative allocation 1815, radio resources are allocated so that no two slices share the same time slot to thereby provide temporal isolation of each slice.

Figure 19:
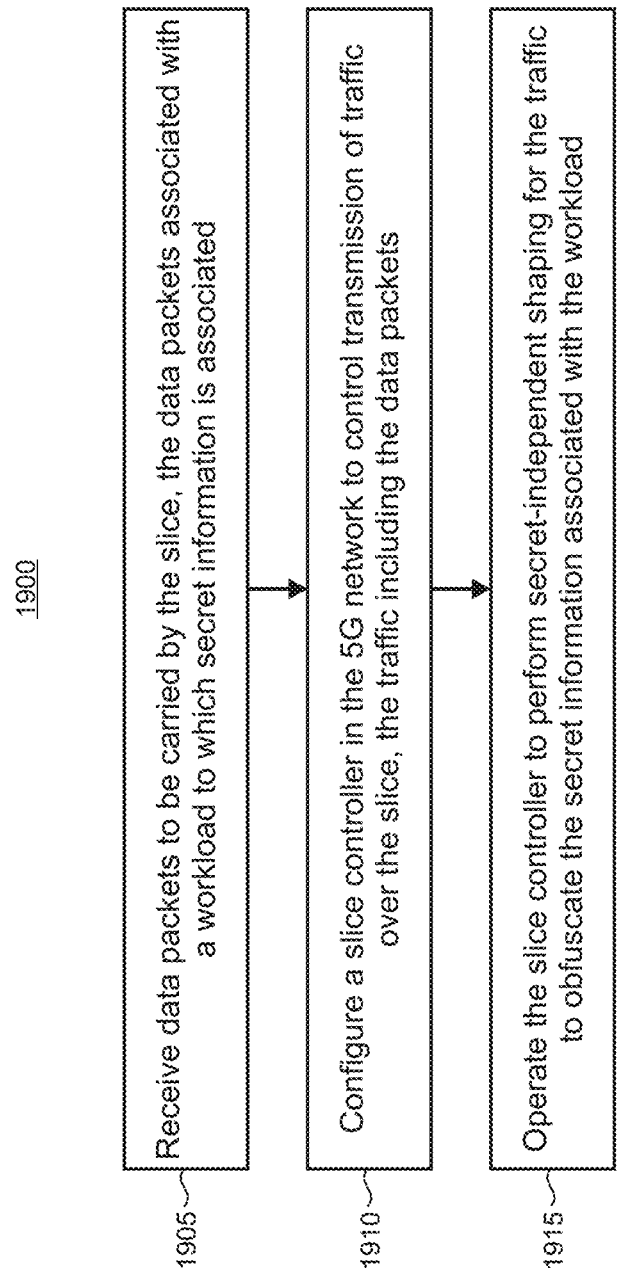
FIGS. 19, 20, and 21 show illustrative methods that may be performed when implementing the present resistance to side-channel attacks on 5G network slices.

FIG. 19 is a flowchart of an illustrative method 1900 that may be performed to increase resistance against side-channel attacks on a slice of a 5G network. Unless specifically stated, methods or steps shown in the flowchart blocks and described in the accompanying text are not constrained to a particular order or sequence. In addition, some of the methods or steps thereof can occur or be performed concurrently and not all the methods or steps have to be performed in a given implementation depending on the requirements of such implementation and some methods or steps may be optionally utilized.

At block 1905, data packets to be carried by the slice are received, in which the data packets are associated with a workload to which secret information is associated. At block 1910, a slice controller in the 5G network is configured to control transmission of traffic over the slice in which the traffic includes the data packets. At block 1915, the slice controller is operated to perform secret-independent shaping for the traffic to obfuscate the secret information associated with the workload.

Figure 20:
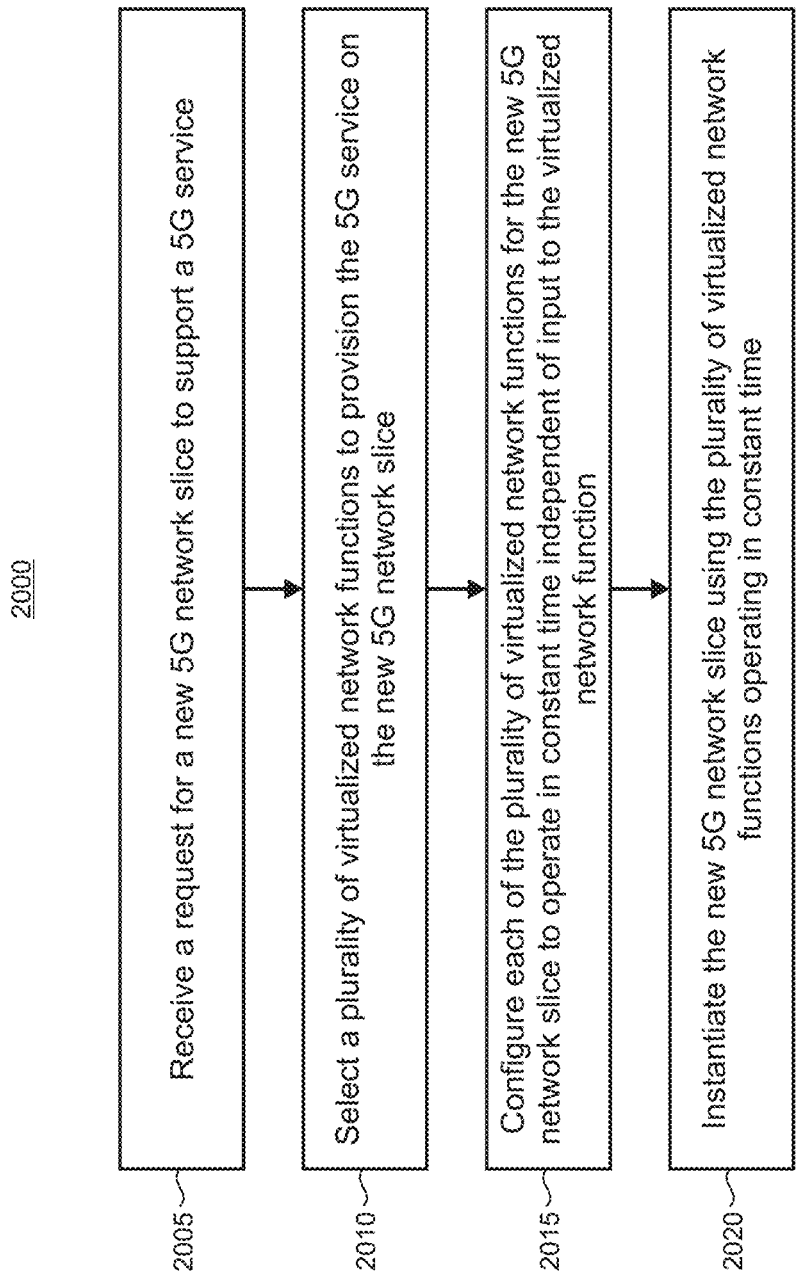

FIG. 20 is a flowchart of an illustrative method 2000 that may be performed by a computing device operating in a 5G network. At block 2005, a request for a new 5G network slice to support a 5G service is received. At block 2010, a plurality of virtualized network functions is selected to provision the 5G service on the new 5G network slice. At block 2015, each of the plurality of virtualized network functions for the new 5G network slice is configured to operate in constant time independent of input to the virtualized network function. At block 2020, the new 5G network slice is instantiated using the plurality of virtualized network functions operating in constant time.

Figure 21:
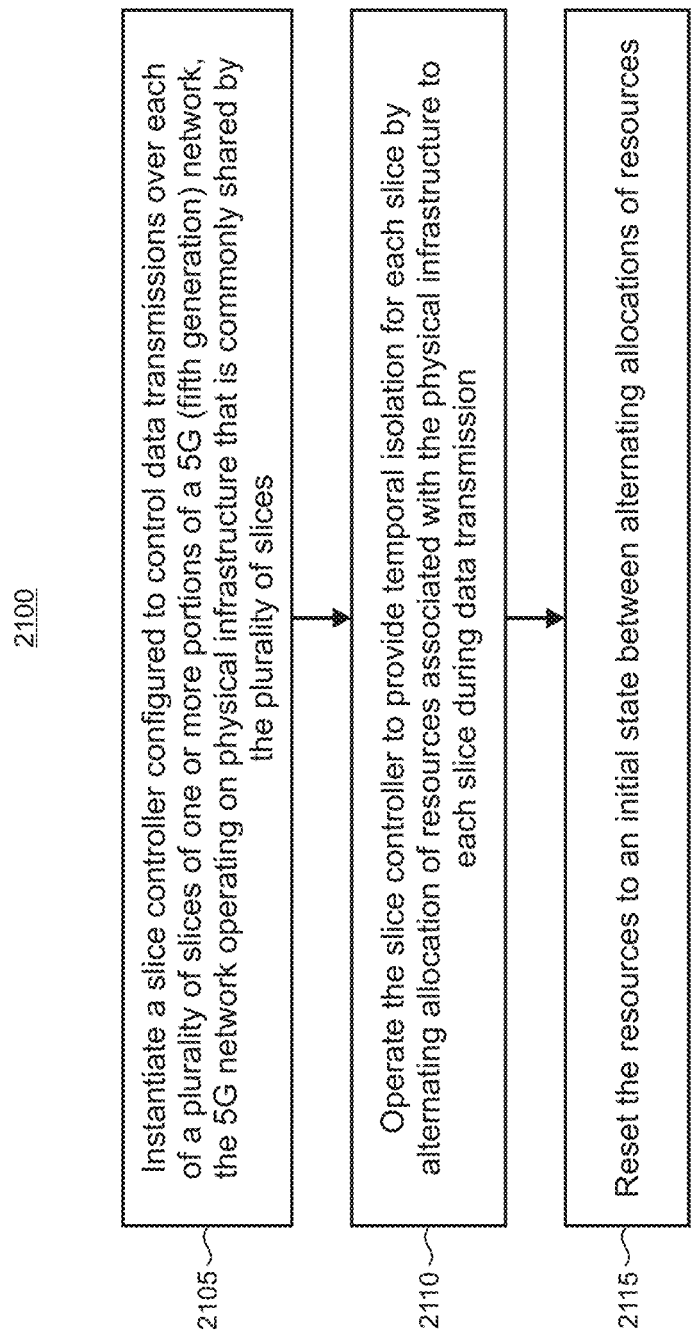

FIG. 21 is a flowchart of an illustrative method 2100 that may be performed by a computing device operating in a 5G network. At block 2105, a slice controller is instantiated which is configured to control data transmissions over each of a plurality of slices of one or more portions of the 5G network, in which the 5G network operates on physical infrastructure that is commonly shared by the plurality of slices. At block 2110, the slice controller is operated to provide temporal isolation for each slice by alternating allocation of resources associated with the physical infrastructure to each slice during data transmission. At block 2115, the resources are reset to an initial state between alternating allocations of resources.

Various different techniques to implement resistance to side-attacks on 5G network slices have been presented above. It may be appreciated that the techniques can be used individually or in different suitable combinations at various portions of a 5G network to meet the needs of particular implementations, applications, and use scenarios.

Figure 22:
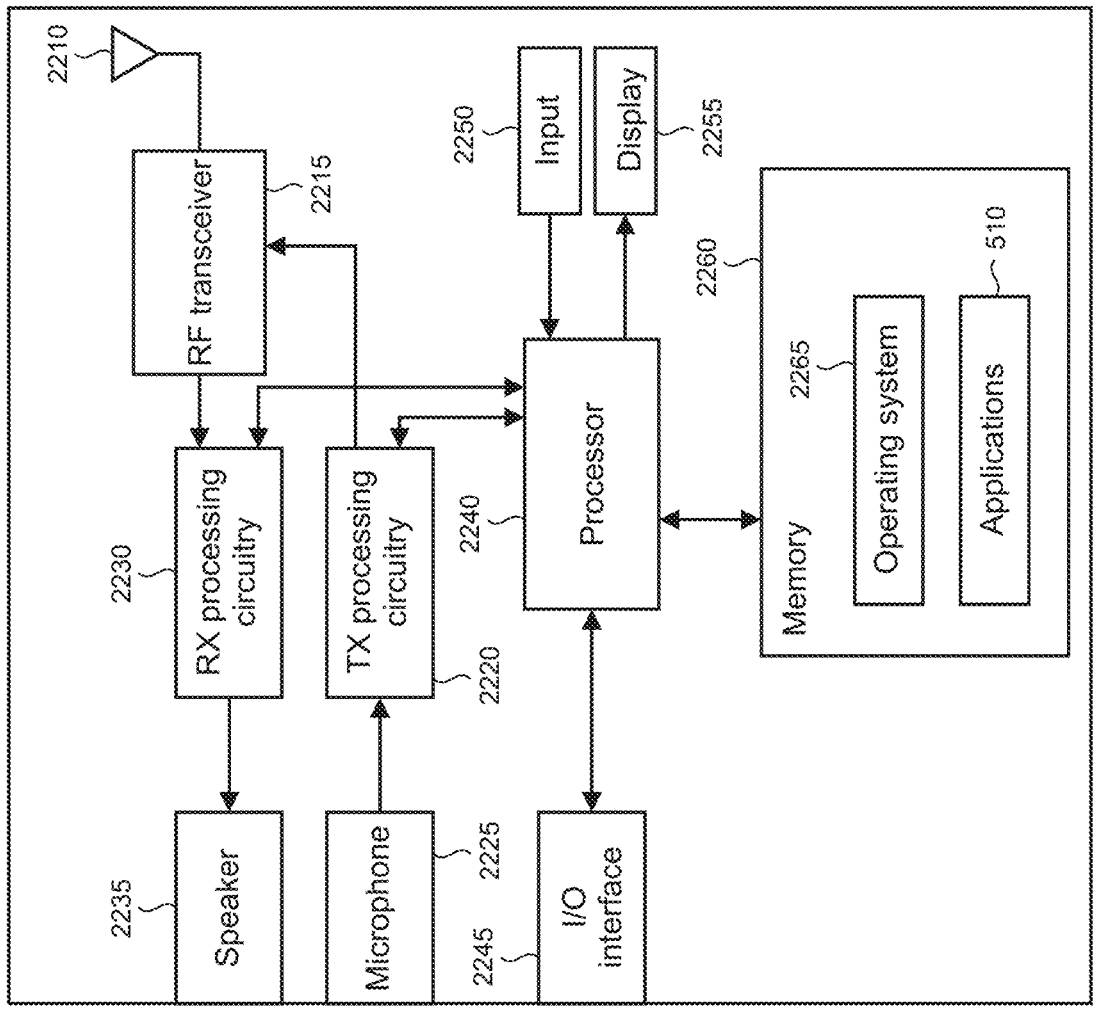
FIG. 22 is a block diagram of an illustrative UE that may be used at least in part to implement the present resistance to side-channel attacks on 5G network slices.

FIG. 22 is a block diagram of an illustrative UE 200 that may be used at least in part to implement the present resistance to side-channel attacks on 5G network slices. The embodiment of the UE 200 shown in FIG. 22 is for illustration only, and the UEs 200 shown in the drawings and described in the preceding text may have the same or similar configuration. However, it is noted that UEs may come in a wide variety of configurations, and FIG. 22 does not limit the scope of the present disclosure to any particular implementation of a UE.

The UE 200 includes an antenna 2210, a radio frequency (RF) transceiver 2215, transmit (TX) processing circuitry 2220, a microphone 2225, and receive (RX) processing circuitry 2230. The UE 200 also includes a speaker 2235, a processor 2240, an input/output (I/O) interface 2245, an input device 2250, a display 2255, and a memory 2260. The memory includes an operating system (OS) program 2265 and one or more applications 510.

The RF transceiver 2215 receives from the antenna 2210, an incoming RF signal transmitted by a gNB of a 5G network 500 (FIG. 5). The RF transceiver down-converts the incoming RF signal to generate an intermediate frequency (IF) or baseband signal. The IF or baseband signal is sent to the RX processing circuitry 2230, which generates a processed baseband signal by filtering, decoding, and/or digitizing the baseband or IF signal. The RX processing circuitry transmits the processed baseband signal to the speaker 2235 (such as for voice data) or to the processor 2240 for further processing (such as for web browsing data).

The TX processing circuitry 2220 receives analog or digital voice data from the microphone 2225 or other outgoing baseband data (such as web data, e-mail, or interactive video game data) from the processor 2240. The TX processing circuitry 2220 encodes, multiplexes, and/or digitizes the outgoing baseband data to generate a processed baseband or IF signal. The RF transceiver 2215 receives the outgoing processed baseband or IF signal from the TX processing circuitry and up-converts the baseband or IF signal to an RF signal that is transmitted via the antenna.

The processor 2240 can include one or more processors or other processing devices and execute the OS program 2265 stored in the memory 2260 to control the overall operation of the UE 200. For example, the processor may control the reception of forward channel signals and the transmission of reverse channel signals by the RF transceiver 2215, the RX processing circuitry 2230, and the TX processing circuitry 2220 in accordance with well-known principles. In some embodiments, the processor 2240 includes at least one microprocessor or microcontroller.

The processor 2240 may be configured for executing other processes and programs resident in the memory 2260, such as operations for CSI measurement and reporting for systems described in embodiments of the present disclosure. The processor can move data into or out of the memory as required by an executing process. In some embodiments, the processor may be configured to execute the applications 510 based on the OS program 2265 or in response to signals received from gNBs or an operator. The processor is also coupled to the I/O interface 2245, which provides the UE 200 with the ability to connect to other computing devices such as laptop computers and handheld computers. The I/O interface may thus function as a communication path between such accessories and the processor.

The processor 2240 is also coupled to the input device 2250 (e.g., keypad, touchscreen, buttons etc.) and the display 2255. A user of the UE 200 can typically employ the input device to enter data into the UE. For example, the display can be a liquid crystal display or other display capable of rendering text and/or graphics, video, etc., from web sites, applications and/or service providers.

The memory 2260 is coupled to the processor 2240. Part of the memory may include a random access memory (RAM), and another part of the memory may include a Flash memory or other read-only memory (ROM).

As described in more detail below, the UE 200 can perform signaling and calculation for channel state information (CSI) reporting. Although FIG. 22 shows one illustrative example of UE 200, it may be appreciated that various changes may be made to the drawing. For example, various components may be combined, further subdivided, or omitted, and additional components may be added according to particular needs. As a particular example, the processor 2240 may be divided into multiple processors, such as one or more central processing units (CPUs) and one or more graphics processing units (GPUs). Also, while FIG. 22 depicts the UE 200 as configured as a mobile device, such as a smartphone, UEs may be configured to operate as other types of portable or stationary devices.

Figure 23:
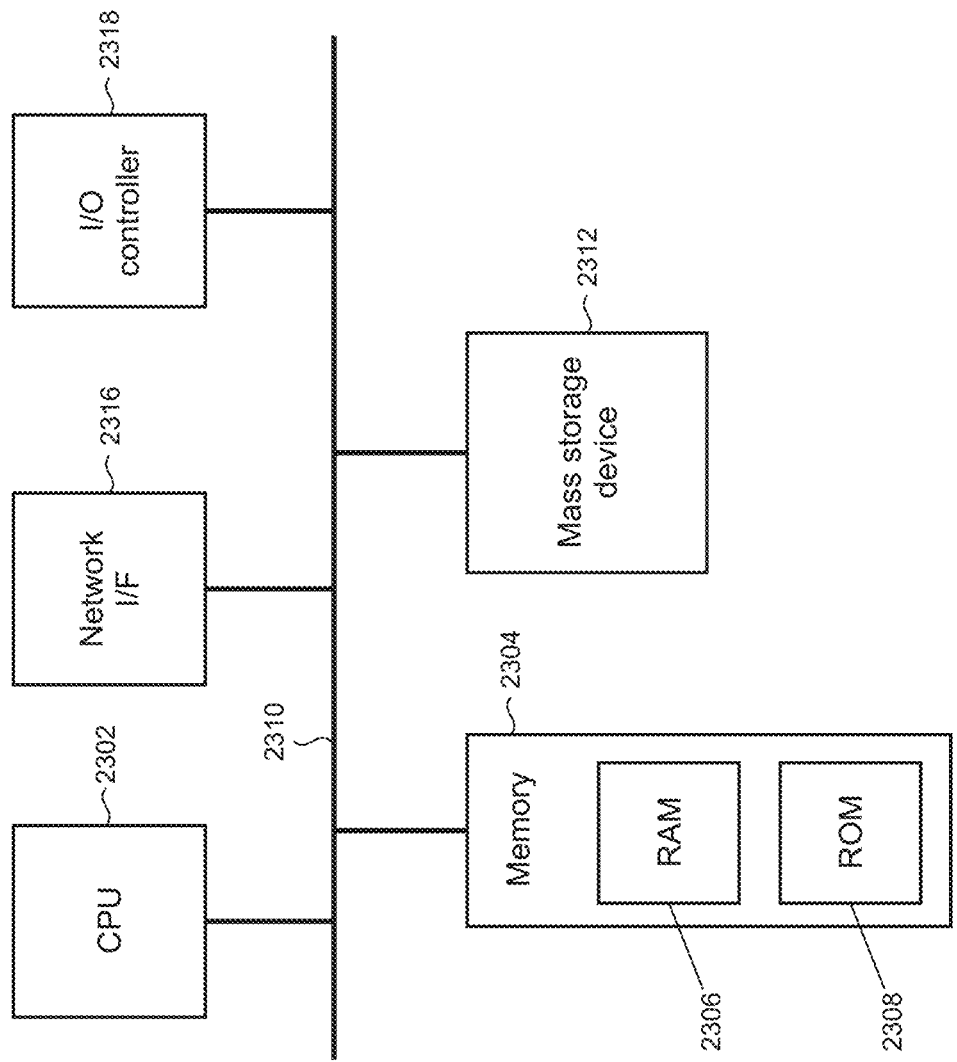
FIG. 23 is a block diagram of an illustrative server or computing device that may be used at least in part to implement the present resistance to side-channel attacks on 5G network slices.

FIG. 23 shows an illustrative architecture 2300 for a computing device, such as a server, capable of executing the various components described herein for the present resistance to side-channel attacks on 5G network slices. The architecture 2300 illustrated in FIG. 23 includes one or more processors 2302 (e.g., central processing unit, dedicated AI chip, graphics processing unit, etc.), a system memory 2304, including RAM (random access memory) 2306 and ROM (read only memory) 2308, and a system bus 2310 that operatively and functionally couples the components in the architecture 2300. A basic input/output system containing the basic routines that help to transfer information between elements within the architecture 2300, such as during startup, is typically stored in the ROM 2308. The architecture 2300 further includes a mass storage device 2312 for storing software code or other computer-executed code that is utilized to implement applications, the file system, and the operating system. The mass storage device 2312 is connected to the processor 2302 through a mass storage controller (not shown) connected to the bus 2310. The mass storage device 2312 and its associated computer-readable storage media provide non-volatile storage for the architecture 2300. Although the description of computer-readable storage media contained herein refers to a mass storage device, such as a hard disk or CD-ROM drive, it may be appreciated by those skilled in the art that computer-readable storage media can be any available storage media that can be accessed by the architecture 2300.

By way of example, and not limitation, computer-readable storage media may include volatile and non-volatile, removable and non-removable media implemented in any method or technology for storage of information such as computer-readable instructions, data structures, program modules, or other data. For example, computer-readable media includes, but is not limited to, RAM, ROM, EPROM (erasable programmable read only memory), EEPROM (electrically erasable programmable read only memory), Flash memory or other solid state memory technology, CD-ROM, DVDs, HD-DVD (High Definition DVD), Blu-ray, or other optical storage, magnetic cassettes, magnetic tape, magnetic disk storage or other magnetic storage devices, or any other medium which can be used to store the desired information and which can be accessed by the architecture 2300.

According to various embodiments, the architecture 2300 may operate in a networked environment using logical connections to remote computers through a network. The architecture 2300 may connect to the network through a network interface unit 2316 connected to the bus 2310. It may be appreciated that the network interface unit 2316 also may be utilized to connect to other types of networks and remote computer systems. The architecture 2300 also may include an input/output controller 2318 for receiving and processing input from a number of other devices, including a keyboard, mouse, touchpad, touchscreen, control devices such as buttons and switches or electronic stylus (not shown in FIG. 23). Similarly, the input/output controller 2318 may provide output to a display screen, user interface, a printer, or other type of output device (also not shown in FIG. 23).

It may be appreciated that the software components described herein may, when loaded into the processor 2302 and executed, transform the processor 2302 and the overall architecture 2300 from a general-purpose computing system into a special-purpose computing system customized to facilitate the functionality presented herein. The processor 2302 may be constructed from any number of transistors or other discrete circuit elements, which may individually or collectively assume any number of states. More specifically, the processor 2302 may operate as a finite-state machine, in response to executable instructions contained within the software modules disclosed herein. These computer-executable instructions may transform the processor 2302 by specifying how the processor 2302 transitions between states, thereby transforming the transistors or other discrete hardware elements constituting the processor 2302.

Encoding the software modules presented herein also may transform the physical structure of the computer-readable storage media presented herein. The specific transformation of physical structure may depend on various factors, in different implementations of this description. Examples of such factors may include, but are not limited to, the technology used to implement the computer-readable storage media, whether the computer-readable storage media is characterized as primary or secondary storage, and the like. For example, if the computer-readable storage media is implemented as semiconductor-based memory, the software disclosed herein may be encoded on the computer-readable storage media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable storage media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media to change the optical characteristics of those locations. Other transformations of physical media are possible without departing from the scope and spirit of the present description, with the foregoing examples provided only to facilitate this discussion.

In light of the above, it may be appreciated that many types of physical transformations take place in the architecture 2300 in order to store and execute the software components presented herein. It also may be appreciated that the architecture 2300 may include other types of computing devices, including wearable devices, handheld computers, embedded computer systems, smartphones, PDAs, and other types of computing devices known to those skilled in the art. It is also contemplated that the architecture 2300 may not include all of the components shown in FIG. 23, may include other components that are not explicitly shown in FIG. 23, or may utilize an architecture completely different from that shown in FIG. 23.

Figure 24:
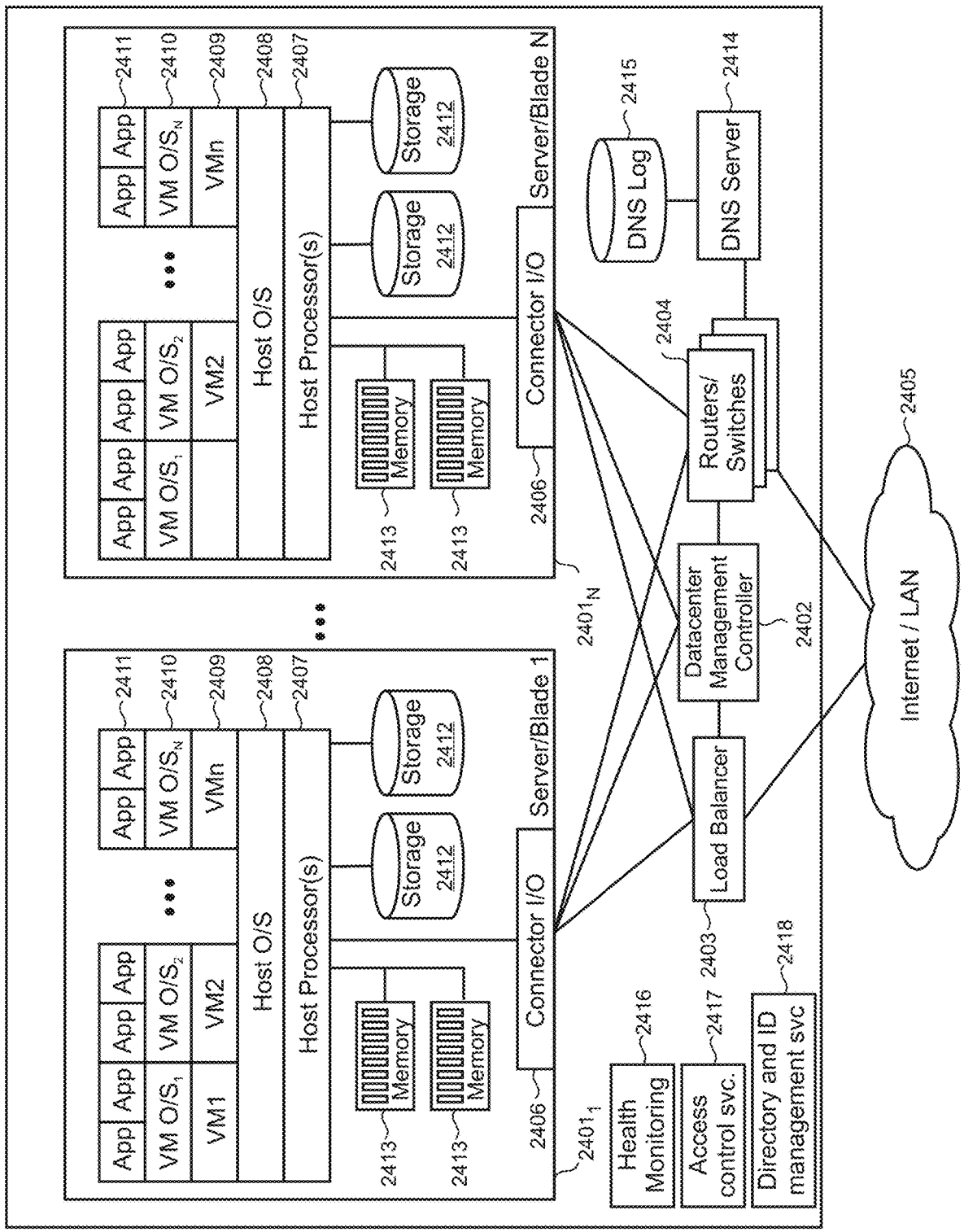
FIG. 24 is a block diagram of an illustrative datacenter that may be used at least in part to implement the present resistance to side-channel attacks on 5G network slices.

FIG. 24 is a high-level block diagram of an illustrative datacenter 2400 that provides cloud computing services or distributed computing services that may be used to implement the present resistance to side-channel attacks on 5G network slices. Datacenter 2400 may incorporate one or more of the features disclosed in the DCs shown in the drawings and described in the accompanying text. A plurality of servers 2401 are managed by datacenter management controller 2402. Load balancer 2403 distributes requests and computing workloads over servers 2401 to avoid a situation wherein a single server may become overwhelmed. Load balancer 2403 maximizes available capacity and performance of the resources in datacenter 2400. Routers/switches 2404 support data traffic between servers 2401 and between datacenter 2400 and external resources and users (not shown) via an external network 2405, which may be, for example, a local area network (LAN) or the Internet.

Servers 2401 may be standalone computing devices, and/or they may be configured as individual blades in a rack of one or more server devices. Servers 2401 have an input/output (I/O) connector 2406 that manages communication with other database entities. One or more host processors 2407 on each server 2401 run a host operating system (O/S) 2408 that supports multiple virtual machines (VM) 2409. Each VM 2409 may run its own O/S so that each VM O/S 2410 on a server is different, or the same, or a mix of both. The VM O/Ss 2410 may be, for example, different versions of the same O/S (e.g., different VMs running different current and legacy versions of the Windows® operating system). In addition, or alternatively, the VM O/Ss 2410 may be provided by different manufacturers (e.g., some VMs running the Windows® operating system, while other VMs are running the Linux® operating system). Each VM 2409 may also run one or more applications (App) 2411. Each server 2401 also includes storage 2412 (e.g., hard disk drives (HDD)) and memory 2413 (e.g., RAM) that can be accessed and used by the host processors 2407 and VMs 2409 for storing software code, data, etc. In one embodiment, a VM 2409 may employ the data plane APIs as disclosed herein.

Datacenter 2400 provides pooled resources on which customers or tenants can dynamically provision and scale applications as needed without having to add servers or additional networking. This allows tenants to obtain the computing resources they need without having to procure, provision, and manage infrastructure on a per-application, ad-hoc basis. A cloud computing datacenter 2400 allows tenants to scale up or scale down resources dynamically to meet the current needs of their business. Additionally, a datacenter operator can provide usage-based services to tenants so that they pay for only the resources they use, when they need to use them. For example, a tenant may initially use one VM 2409 on server 2401$_1$ to run their applications 2411. When demand for an application 2411 increases, the datacenter 2400 may activate additional VMs 2409 on the same server 2401$_1$ and/or on a new server 2401$_N$ as needed. These additional VMs 2409 can be deactivated if demand for the application later drops.

Datacenter 2400 may offer guaranteed availability, disaster recovery, and back-up services. For example, the datacenter may designate one VM 2409 on server 2401$_1$ as the primary location for the tenant's application and may activate a second VM 2409 on the same or a different server as a standby or back-up in case the first VM or server 2401$_1$ fails. The datacenter management controller 2402 automatically shifts incoming user requests from the primary VM to the back-up VM without requiring tenant intervention. Although datacenter 2400 is illustrated as a single location, it will be understood that servers 2401 may be distributed to multiple locations across the globe to provide additional redundancy and disaster recovery capabilities. Additionally, datacenter 2400 may be an on-premises, private system that provides services to a single enterprise user or may be a publicly accessible, distributed system that provides services to multiple, unrelated customers and tenants or may be a combination of both.

Domain Name System (DNS) server 2414 resolves domain and host names into IP addresses for all roles, applications, and services in datacenter 2400. DNS log 2415 maintains a record of which domain names have been resolved by role. It will be understood that DNS is used herein as an example and that other name resolution services and domain name logging services may be used to identify dependencies, for example, in other embodiments, IP or packet sniffing, code instrumentation, or code tracing.

Datacenter health monitoring 2416 monitors the health of the physical systems, software, and environment in datacenter 2400. Health monitoring 2416 provides feedback to datacenter managers when problems are detected with servers, blades, processors, or applications in datacenter 2400 or when network bandwidth or communications issues arise.

Access control service 2417 determines whether users are allowed to access particular connections and services provided at the datacenter 2400. Directory and identity management service 2418 authenticates user credentials for tenants on datacenter 2400.

FIG. 25 is a simplified block diagram of an illustrative computer system 2500 such as a PC, client machine, or server with which the present resistance to side-channel attacks on 5G network slices s may be implemented. Computer system 2500 includes a processor 2505, a system memory 2511, and a system bus 2514 that couples various system components including the system memory 2511 to the processor 2505. The system bus 2514 may be any of several types of bus structures including a memory bus or memory controller, a peripheral bus, or a local bus using any of a variety of bus architectures. The system memory 2511 includes read only memory (ROM) 2517 and random access memory (RAM) 2521. A basic input/output system (BIOS) 2525, containing the basic routines that help to transfer information between elements within the computer system 2500, such as during startup, is stored in ROM 2517. The computer system 2500 may further include a hard disk drive 2528 for reading from and writing to an internally disposed hard disk (not shown), a magnetic disk drive 2530 for reading from or writing to a removable magnetic disk 2533 (e.g., a floppy disk), and an optical disk drive 2538 for reading from or writing to a removable optical disk 2543 such as a CD (compact disc), DVD (digital versatile disc), or other optical media. The hard disk drive 2528, magnetic disk drive 2530, and optical disk drive 2538 are connected to the system bus 2514 by a hard disk drive interface 2546, a magnetic disk drive interface 2549, and an optical drive interface 2552, respectively. The drives and their associated computer-readable storage media provide non-volatile storage of computer-readable instructions, data structures, program modules, and other data for the computer system 2500. Although this illustrative example includes a hard disk, a removable magnetic disk 2533, and a removable optical disk 2543, other types of computer-readable storage media which can store data that is accessible by a computer such as magnetic cassettes, Flash memory cards, digital video disks, data cartridges, random access memories (RAMs), read only memories (ROMs), and the like may also be used in some applications of the present resistance to side-channel attacks on 5G network slices. In addition, as used herein, the term computer-readable storage media includes one or more instances of a media type (e.g., one or more magnetic disks, one or more CDs, etc.). For purposes of this specification and the claims, the phrase "computer-readable storage media" and variations thereof, are intended to cover non-transitory embodiments, and does not include waves, signals, and/or other transitory and/or intangible communication media.

A number of program modules may be stored on the hard disk, magnetic disk 2533, optical disk 2543, ROM 2517, or RAM 2521, including an operating system 2555, one or more application programs 2557, other program modules 2560, and program data 2563. A user may enter commands and information into the computer system 2500 through input devices such as a keyboard 2566 and pointing device 2568 such as a mouse. Other input devices (not shown) may include a microphone, joystick, game pad, satellite dish, scanner, trackball, touchpad, touchscreen, touch-sensitive device, voice-command module or device, user motion or user gesture capture device, or the like. These and other input devices are often connected to the processor 2505 through a serial port interface 2571 that is coupled to the system bus 2514, but may be connected by other interfaces, such as a parallel port, game port, or universal serial bus (USB). A monitor 2573 or other type of display device is also connected to the system bus 2514 via an interface, such as a video adapter 2575. In addition to the monitor 2573, personal computers typically include other peripheral output devices (not shown), such as speakers and printers. The illustrative example shown in FIG. 25 also includes a host adapter 2578, a Small Computer System Interface (SCSI) bus 2583, and an external storage device 2576 connected to the SCSI bus 2583.

The computer system 2500 is operable in a networked environment using logical connections to one or more remote computers, such as a remote computer 2588. The remote computer 2588 may be selected as another personal computer, a server, a router, a network PC, a peer device, or other common network node, and typically includes many or all of the elements described above relative to the computer system 2500, although only a single representative remote memory/storage device 2590 is shown in FIG. 25. The logical connections depicted in FIG. 25 include a local area network (LAN) 2593 and a wide area network (WAN) 2595. Such networking environments are often deployed, for example, in offices, enterprise-wide computer networks, intranets, and the Internet.

When used in a LAN networking environment, the computer system 2500 is connected to the local area network 2593 through a network interface or adapter 2596. When used in a WAN networking environment, the computer system 2500 typically includes a broadband modem 2598, network gateway, or other means for establishing communications over the wide area network 2595, such as the Internet. The broadband modem 2598, which may be internal or external, is connected to the system bus 2514 via a serial port interface 2571. In a networked environment, program modules related to the computer system 2500, or portions thereof, may be stored in the remote memory storage device 2590. It is noted that the network connections shown in FIG. 25 are illustrative and other means of establishing a communications link between the computers may be used depending on the specific requirements of an application of the present resistance to side-channel attacks on 5G network slices.

Various exemplary embodiments of the present resistance to side-channel attacks on 5G network slices are now presented by way of illustration and not as an exhaustive list of all embodiments. An example includes a computer-implemented method for increasing resistance to side-channel attacks on a slice of a 5G (fifth generation) network having a plurality of slices that share underlying physical network infrastructure, the method comprising: receiving data packets to be carried by the slice, the data packets associated with a workload to which secret information is associated; configuring a slice controller in the 5G network to control transmission of traffic over the slice, the traffic including the data packets; and operating the slice controller to perform secret-independent shaping for the traffic to obfuscate the secret information associated with the workload.

In another example, the secret-independent traffic shaping comprises transforming each of the data packets to have a fixed packet length. In another example, the workload provides timing for the data packets and the secret-independent traffic shaping comprises perturbing the timing for the data packets. In another example, the perturbation of the timing for the data packets includes imposing a fixed transmission time interval for each of the data packets. In another example, the secret-independent traffic shaping comprises imposing a synthetic distribution for time-based aspects of data packet transmission. In another example, the synthetic distribution comprises fixed sizes for data packets and fixed data packet transmission time intervals. In another example, the fixed data packet sizes and fixed data packet transmission time intervals include deviations within a predetermined threshold, the threshold selected to prevent revealing the secret information. In another example, the slice controller operates to control transmission over a portion of the 5G network, the portion including one of radio access network (RAN), wide area network (WAN), or cloud network, and the secret-independent traffic shaping is applied to data traffic on the portion of the 5G network. In another example, the computer-implemented method further comprises controlling a degree of secret-independent traffic shaping based on a type of the data packets.

A further example includes one or more hardware-based non-transitory computer-readable memory devices storing computer-executable instructions which, upon execution by one or more processors disposed in a computing device deployed in a 5G (fifth generation) network comprising a plurality of slices, cause the computing device to: receive a request for a new 5G network slice to support a 5G service; select a plurality of virtualized network functions to provision the 5G service on the new 5G network slice; configure each of the plurality of virtualized network functions for the new 5G network slice to operate in constant time, independent of input to the virtualized network function; and instantiate the new 5G network slice using the plurality of virtualized network functions operating in constant time.

In another example, the virtualized network functions are implemented using code for which code control flow comprises single-entry, single-exit subgraphs and excludes hammock nodes. In another example, the virtualized network functions are implemented using code having loops that execute a constant fixed number of iterations. In another example, the virtualized network functions are implemented using code for which sources of variable latency are eliminated. In another example, the operation of virtualized network functions in constant time prevents timing leakage from the new 5G network slice during support of the 5G service.

A further example includes a computing device operable in a 5G (fifth generation) network, comprising: at least one processor; and at least one hardware-based non-transitory computer-readable storage device having computer-executable instructions stored thereon which, when executed by the least one processor, cause the computing device to instantiate a slice controller configured to control data transmissions over each of a plurality of slices of one or more portions of the 5G network, the 5G network operating on physical infrastructure that is commonly shared by the plurality of slices; operate the slice controller to provide temporal isolation for each slice by alternating allocation of resources associated with the physical infrastructure to each slice during data transmission; and reset the resources to an initial state between alternating allocations of resources.

In another example, one or more portions of the 5G network comprise a radio access network (RAN), a mobile core, and a wide area network (WAN). In another example, the one or more portions of the 5G network comprise a radio access network (RAN) and the resources comprise subcarriers and time slots for the RAN. In another example, the alternating allocation is performed at a rate that is based on time required for resource reset. In another example, the alternating allocation is performed in view of quality of service (QoS) metrics that are appliable to the plurality of slices. In another example, the computer-executable instructions further cause the computing device to utilize the temporal isolation on a slice to isolate security-sensitive code execution.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A computer-implemented method for increasing resistance to side-channel attacks on a first slice of a 5G (fifth generation) network having a plurality of slices, including at least a second slice, that share underlying physical network resources and infrastructure in a core network, radio access network, and wide area network, the method comprising:

receiving data packets to be carried by the slice, the data packets associated with a workload to which secret information is associated, the data packets having transmission characteristics with a natural timing distribution that is inherent to the workload;

configuring a slice controller in the 5G network to control transmission of traffic over the slice, the traffic including the data packets, and wherein the slice controller is implemented as a software-defined networking (SDN) component instantiated on the underlying physical network infrastructure for controlling slicing in the core network, radio access network, and wide area network; and operating the slice controller to perform secret-independent shaping for the traffic to obfuscate the secret information associated with the workload for the first slice from the second slice, wherein the secret-independent shaping comprises enforcing temporal isolation of shared physical network resources between the first slice and second slice in which the slice controller alternately allocates shared physical network resources to the first slice and the second slice to prevent simultaneous use of the shared physical network resources by the first slice and the second slice.

2. The computer-implemented method of claim 1 in which the secret-independent traffic shaping comprises transforming each of the data packets to have a fixed packet length.

3. The computer-implemented method of claim 1 in which the workload provides timing for the data packets and the secret-independent traffic shaping comprises perturbing the timing for the data packets.

4. The computer-implemented method of claim 3 in which the perturbation of the timing for the data packets includes imposing a fixed transmission time interval for each of the data packets.

5. The computer-implemented method of claim 1 in which the secret-independent traffic shaping comprises imposing a synthetic distribution for time-based aspects of data packet transmission.

6. The computer-implemented method of claim 5 in which the synthetic distribution comprises fixed sizes for data packets and fixed data packet transmission time intervals.

7. The computer-implemented method of claim 6 in which the fixed data packet sizes and fixed data packet transmission time intervals include deviations within a predetermined threshold, the threshold selected to prevent revealing the secret information.

8. The computer-implemented method of claim 1 in which the slice controller operates to control transmission over a portion of the 5G network, the portion including one of radio access network (RAN), wide area network (WAN), or cloud network, and the secret-independent traffic shaping is applied to data traffic on the portion of the 5G network.

9. The computer-implemented method of claim 1 further comprising controlling a degree of secret-independent traffic shaping based on a type of the data packets.

* * * * *